(12) United States Patent
Max et al.

(10) Patent No.: US 7,255,794 B2
(45) Date of Patent: Aug. 14, 2007

(54) HYDRATE-BASED REDUCTION OF FLUID INVENTORIES AND CONCENTRATION OF AQUEOUS AND OTHER WATER-CONTAINING PRODUCTS

(75) Inventors: Michael D. Max, St. Pete Beach, FL (US); John P. Osegovic, Tampa, FL (US)

(73) Assignee: Marine Desalination Systems, LLC, St. Petersburg, FL (US)

( * ) Notice: Subject to any disclaimer, the term of this patent is extended or adjusted under 35 U.S.C. 154(b) by 0 days.

(21) Appl. No.: 11/504,659

(22) Filed: Aug. 16, 2006

(65) Prior Publication Data

US 2006/0273036 A1 Dec. 7, 2006

Related U.S. Application Data

(60) Division of application No. 10/833,175, filed on Apr. 28, 2004, now abandoned, which is a continuation-in-part of application No. 10/266,258, filed on Oct. 8, 2002, now Pat. No. 6,733,667, which is a division of application No. 09/397,500, filed on Sep. 17, 1999, now Pat. No. 6,497,794, which is a continuation-in-part of application No. 09/375,410, filed on Aug. 17, 1999, now Pat. No. 6,531,034, which is a continuation-in-part of application No. 09/350,906, filed on Jul. 12, 1999, now Pat. No. 6,565,715.

(51) Int. Cl.
*C02F 1/00* (2006.01)

(52) U.S. Cl. .................. 210/711; 62/532; 210/712; 210/718; 210/737; 210/749; 210/906; 585/15

(58) Field of Classification Search ................ 210/702
See application file for complete search history.

(56) References Cited

U.S. PATENT DOCUMENTS 2,904,511 A 9/1959 Donath (Continued)

FOREIGN PATENT DOCUMENTS

JP 55055125 4/1980

(Continued)

OTHER PUBLICATIONS

Max et al., "Extraction of Methane from Oceanic Hydrate System Deposits," Offshore Technology Conference, Paper No. 10727, pp. 1-8 (1999).

(Continued)

*Primary Examiner*—Peter A. Hruskoci
(74) *Attorney, Agent, or Firm*—Kenneth M. Fagin, Esq.; Novak, Bruce, DeLuca & Quig LL

(57) ABSTRACT

Toxic waste waters polluted with high levels of chemical byproducts of various industrial processes (e.g., waste water held in industrial holding ponds) are treated using gas hydrate to extract and remove fresh water from the polluted water, thus reducing the volume of toxic waste water inventories. Extracting fresh water by forming and removing the hydrate raises the concentration of dissolved materials in the residual concentrated brines to levels at which the residual fluid is suitable for use as an industrial feedstock. Furthermore, so raising the concentration of the residual brine will cause certain mineral species to precipitate out of solution, which mineral species are separated from the fluid and may be put to other uses, as appropriate. Food products are also advantageously concentrated by means of gas hydrates.

10 Claims, 21 Drawing Sheets

U.S. PATENT DOCUMENTS

| | | | |
|---|---|---|---|
| 2,974,102 A | 3/1961 | Williams |
| 3,027,320 A | 3/1962 | Buchanan |
| 3,119,771 A | 1/1964 | Cottle |
| 3,119,772 A | 1/1964 | Hess et al. |
| 3,126,334 A | 3/1964 | Harlow |
| 3,132,096 A | 5/1964 | Walton |
| 3,148,143 A | 9/1964 | Donath |
| 3,155,610 A | 11/1964 | Williams |
| 3,171,727 A | 3/1965 | Brown et al. |
| 3,214,371 A | 10/1965 | Tuwiner |
| 3,217,505 A | 11/1965 | Tuwiner |
| 3,243,966 A | 4/1966 | Glew |
| 3,308,063 A | 3/1967 | Hess et al. |
| 3,350,299 A | 10/1967 | Hess et al. |
| 3,350,300 A | 10/1967 | Hess et al. |
| 3,371,035 A | 2/1968 | Jacobs et al. |
| 3,415,747 A | 12/1968 | Glew |
| 3,675,436 A | 7/1972 | Ganiaris |
| 3,712,075 A | 1/1973 | Smith et al. |
| 3,813,892 A | 6/1974 | Johnson et al. |
| 3,856,492 A | 12/1974 | Klass |
| 3,892,103 A | 7/1975 | Antonelli |
| 3,983,032 A | 9/1976 | Hess et al. |
| 3,992,170 A | 11/1976 | Karnofsky |
| 4,170,328 A | 10/1979 | Kirk et al. |
| 4,207,351 A | 6/1980 | Davies |
| 4,267,022 A | 5/1981 | Pitcher |
| 4,272,383 A | 6/1981 | McGrew |
| 4,278,645 A | 7/1981 | Filss |
| 4,376,462 A | 3/1983 | Elliott et al. |
| 4,392,959 A | 7/1983 | Coillet |
| 4,424,858 A | 1/1984 | Elliott et al. |
| 4,643,832 A | 2/1987 | Iniotakis et al. |
| 4,652,375 A | 3/1987 | Heilweil et al. |
| 4,670,159 A | 6/1987 | Garrett et al. |
| 4,678,583 A | 7/1987 | Wilson, III et al. |
| 4,686,833 A | 8/1987 | Hino et al. |
| 4,696,338 A | 9/1987 | Jensen |
| 4,718,242 A | 1/1988 | Yamauchi et al. |
| 4,767,527 A | 8/1988 | Iniotakis et al. |
| 4,821,794 A | 4/1989 | Tsai et al. |
| 4,830,862 A | 5/1989 | Braun et al. |
| 5,037,555 A | 8/1991 | Pasternak et al. |
| 5,055,178 A | 10/1991 | Sugier et al. |
| 5,076,934 A | 12/1991 | Fenton |
| 5,110,479 A | 5/1992 | Frommer et al. |
| 5,128,042 A | 7/1992 | Fenton |
| 5,159,971 A | 11/1992 | Li |
| 5,167,838 A | 12/1992 | Wilensky |
| 5,304,356 A | 4/1994 | Iijima et al. |
| 5,362,467 A | 11/1994 | Sakai et al. |
| 5,364,611 A | 11/1994 | Iijima et al. |
| 5,397,553 A | 3/1995 | Spencer |
| 5,444,986 A | 8/1995 | Hino |
| 5,448,892 A | 9/1995 | Cheng |
| 5,473,904 A | 12/1995 | Guo et al. |
| 5,497,630 A | 3/1996 | Stein et al. |
| 5,512,176 A | 4/1996 | Blair |
| 5,553,456 A | 9/1996 | McCormack |
| 5,562,891 A | 10/1996 | Spencer et al. |
| 5,660,603 A | 8/1997 | Elliot et al. |
| 5,679,254 A | 10/1997 | Chakrabarti |
| 5,816,057 A | 10/1998 | Dickey et al. |
| 5,873,262 A | 2/1999 | Max et al. |
| 6,028,234 A | 2/2000 | Heinemann et al. |
| 6,089,022 A | 7/2000 | Zednik et al. |
| 6,106,595 A | 8/2000 | Spencer |
| 6,106,795 A * | 8/2000 | Conant ............... 423/531 |
| 6,112,528 A | 9/2000 | Rigby |
| 6,158,239 A | 12/2000 | Max |
| 6,180,843 B1 | 1/2001 | Heinemann et al. |
| 6,245,955 B1 | 6/2001 | Smith |
| 6,296,060 B1 | 10/2001 | McCaslin |

FOREIGN PATENT DOCUMENTS

| | | |
|---|---|---|
| JP | 58109179 | 6/1983 |
| JP | 59029078 | 2/1984 |
| JP | 61025682 | 2/1986 |
| JP | 11319805 | 11/1999 |
| JP | 2000202444 | 7/2000 |
| SU | 997715 | 2/1983 |
| SU | 1006378 | 3/1983 |
| WO | 1320134 | 6/1973 |
| WO | WO 01/04056 A1 | 1/2001 |
| WO | WO01/34267 A1 | 5/2001 |

OTHER PUBLICATIONS

Max and Lowrie, "Oceanic Methane Hydrates: A "Frontier" Gas Resource," *Journal of Petroleum Geology* vol. 19(1), pp. 41-56 (Jan. 1996).

Max and Dillon, "Oceanic Methane Hydrate: The Character of the Blake Ridge Hydrate Stability Zone, and the Potential for Methane Extraction," *Journal of Petroleum Geology*, vol. 21(3), pp. 343-358 (Jul. 1998).

Max, M.D., "Oceanic Methane Hydrate: The character of the Blake Ridge Hydrate Stability Zone, and the Potential for Methane Extraction," author's correction, *Journal of Petroleum Geology*, vol. 22(2), pp. 227-228 (Apr. 1999).

Max and Lowrie, "Oceanic Methane Hydrate Development: Reservoir Character and Extraction," Offshore Technology Conference, Paper No. 8300, pp. 235-240 (1997).

Max et al., "Methane Hydrate, A Special Clathrate: Its Attributes and Potential," *Naval Research Laboratory*, NRL/MR/6101-97-7926, pp. 1-74 (Feb. 28, 1997).

Max and Chandra, "The dynamic Oceanic Hydrate System: Production Constraints and Strategies," Offshore Technology Conference, Paper No. 8684, pp. 1-10 (1998).

Rautenbach et al., Entwicklung und Optimierung eines Hydrat-Verfahrens zur Meerwasserentsalzung, Chemie-Ing.-Techn 45 jahrg. 1973/Nr. 5, pp. 259-254.

Siliber, Methane Cooled Desalination Method and Apparatus, USPTO, Defensive Publication T939,007—Published Oct. 7, 1975.

Japanese Abstract, Journal No. G0941AAK ISSN No. 0453-0683, 1995, vol. 42, No. 7. Accession No. 95A0492545, File Segment: JICST-E.

EPO—Patent Abstracts of Japan Publication No. 61136481, Publication date Jun. 24, 1986, Muneschichi, Concentration of Aqueous Solution English language abstract.

Russian Abstract Publication No. 2166348, May 10, 2001, Mel'nikov et al.

Concentration Specialists, Inc., Andover, MA, "OWRT Freezing Pilot Plant Absorption freezing Vapor Compression (AFVC) 25,000 gpd," Wrightsville Beach, NC, NCSU, (Jan. 1982).

Chicago Bridge and Iron Company (CBI), "OWRT Freezing Pilot Plant Falling Film Indirect Freezing 6,000 gpb," CBI Test Facility Oakbrook, IL (Jan. 1982).

Wiegandt, "Desalination by Freezing," School of Chemical Engineering, Cornell University, Ithaca, NY, pp. 1-96, (Mar. 1990).

W. J. Hahn, "Present Status of the Office of Saline Water Freezing Process Program," Wrightsville Beach Test Facility, pp. 1-13 (DSP 6/11), date unknown.

A.J. Barduhn, "Desalination by Freezing Processes," Encyclopedia of Chemical Processing and Design, vol. 14, pp. 361-386, (© 1982).

Viahakis et al., "the Growth Rate of Ice Crystals: The Properties of Carbon Dioxide Hydrate A Review of Properties of 51 Gas Hydrates," Research and Development Progress Report No. 830, Dept. of Interior, PB-217-615, (Nov. 1972).

Campbell et al., "Gravity Wash Column Design, Procurement, and Installation: Followed by Development Tests of the Modified Singe-Stage Desalting Pilot Plant at Wrightsville," Office of Water Research and Technology, Washington, D.C., W8100689 OWRT7514(1), Contract D1-14-34-001-7514, (1979) pp. 1-74.

Patent Abstracts of Japan, vol. 2000, No. 02, Feb. 29, 2000 and JP 11319805A, Nov. 24, 1999 (abstract).

Database WPI, Section Ch, Week 1988 12, Derwent Publications Ltd., London, GB; AN 1988-082320, XP002143497 & SU 1 328 298 A (Odessa Refrig Ind Res), Aug. 7, 1987, (abstract).

EPO—Patent Abstracts of Japan, Publication No. 11319805, Publication Date: 224-11-99, Separation of Gaseous Mixture Utilizing Gas Hydrate and Method for Desalting Seawater—English language abstract, date unknown.

XP-002143497 SU 1328298 English language abstract, date unknown.

* cited by examiner

HYDRATE-BASED REDUCTION OF FLUID INVENTORIES AND CONCENTRATION OF AQUEOUS AND OTHER WATER-CONTAINING PRODUCTS

CROSS-REFERENCE TO RELATED APPLICATIONS

This application is a divisional of U.S. application Ser. No. 10/833,175 filed Apr. 28, 2004, now abandoned, which is a continuation-in-part of U.S. application Ser. No. 10/266,258 filed Oct. 8, 2002 (issued May 11, 2004 as U.S. Pat. No. 6,733,667). That application is a divisional of U.S. application Ser. No. 09/397,500 filed Sep. 17, 1999 (issued Dec. 24, 2002 as U.S. Pat. No. 6,497,794), which is a continuation-in-part of U.S. application Ser. No. 09/375,410 filed Aug. 17, 1999 (issued Mar. 11, 2003 as U.S. Pat. No. 6,531,034), which is a continuation-in-part of U.S. application Ser. No. 09/350,906 filed on Jul. 12, 1999 (issued May 20, 2003 as U.S. Pat. No. 6,565,715).

STATEMENT REGARDING FEDERALLY SPONSORED RESEARCH AND DEVELOPMENT

This invention was made with Government support under Contract No. NBCHC 010003 dated Jan. 29, 2001 and issued by the Department of the Interior—National Business Center (DARPA). The Government has certain rights in the invention.

FIELD OF THE INVENTION

The invention relates to reducing fluid inventories and concentrating aqueous and other water-containing products using hydrates to extract fresh water from the fluid inventories or from the material being concentrated, respectively.

BACKGROUND OF THE INVENTION

In general, desalination and purification of saline or polluted water using gas hydrates is known in the art. See, for example, the above-referenced issued patents to which this application is related, the contents of each of which are incorporated by reference and replicated below. According to those patents, a hydrate-forming gas, liquid, or mixture of gases or liquids is combined with water to be treated under pressure and temperature conditions at which hydrate spontaneously forms, i.e., conditions within the hydrate pressure/temperature stability zone for the particular hydrate-forming substance used. The hydrate is then naturally or mechanically separated from the residual brine ("brine" being used herein to refer to either residual saltwater or residual polluted water, depending on the particular context) and allowed or caused to dissociate (melt), thereby releasing fresh water (e.g., for drinking) and the hydrate-forming substance. Alternatively, as taught in co-pending application Ser. No. 10/429,765 filed May 6, 2003 (published Nov. 13, 2003 as Publication No. 2003/0209492), the contents of which are incorporated by reference, hydrate may be caused to form on or collect against a permeable support member, then be caused to dissociate against the support member (e.g., by lowering pressure on the side of the support member opposite to the hydrate), with the released hydrate-forming substance (e.g., gas) and pure water passing through the permeable support member to be collected on the opposite side.

It is also known to conduct hydrate-based desalination in an open-ocean installation, as disclosed, for example, in U.S. Pat. Nos. 5,873,262 and 3,027,320.

According to the referenced patents and published application, the hydrate may be formed in a hydrate-formation region at the bottom of a body of water (either formed in land or in an open-ocean environment), where the pressure is naturally high enough for hydrate to form. Alternatively, the hydrate may be formed in a pressurized hydrate formation vessel. In either case, the residual brine will have somewhat elevated concentrations of salt (NaCl) or other chemical pollutants, solute(s), or suspended particulate matter.

Where the primary reason for forming hydrate in seawater or polluted water is to obtain water for potable, agricultural, or industrial use, low conversion rates—i.e., relatively small percentage removal of water—are often desirable to maintain the environmental quality of the residual water, which may be returned to its source.

On the other hand, there are certain cases of naturally occurring, highly acidified bodies of water the salinities of which are in the brackish to seawater range and which are toxic to aquatic life. For certain other bodies of water, where the salinity of each of the various dissolved chemical species is much higher than naturally occurring water—the term "salinity" being used here and throughout this application in the broadest sense, as appropriate—and where the pH of the water is dramatically different from naturally occurring water, the environmental concerns associated with them and the water treatment processes typically employed with them may be substantially different from those associated with and used for treating natural seawater or brackish water. These bodies of water are not generally naturally occurring, but are commonly the residue of industrial processes and are commonly referred to as "toxic wastes." In contrast to the case for seawater or brackish water, where total salinity and the amount of suspended matter is naturally occurring and of such compositions and concentrations as to be tolerable for a wide variety of life forms, toxic wastes are inhospitable to a wide variety of life forms and may comprise dangerous biotoxins. Therefore, in these cases, it may be desirable to reduce as much as possible the volume of water that has been made toxic by the presence of dissolved chemical substances.

In that regard, there is a general need in many industries that produce large volumes of toxic waste water to reduce the volumes of such fluids, which may be held in large ponds. For instance, the wet process manufacture of phosphoric acid as practiced in Florida and many other parts of the world requires a large volume of process water that is used as a water source for the phosphoric acid; for gas scrubbing; to slurry the phosphogypsum produced and transport it to storage; to operate barometric condensers; and for a multitude of other uses in the chemical complex. A major portion of the heat released in the process ends up in the process water and is discharged to the atmosphere by evaporative cooling. The process water is stored in holding ponds that provide the large surface area needed for evaporation and cooling of the water. (Other industries, such as the micro-electronics industry, mining, coal beneficiation, and metal coatings industries, can also produce waste water inventories that are held in such holding ponds.)

Such pond water is extremely acidic (pH=1 to 2). (For reference, most fish are killed when the water reaches a pH of 5.6, and entire lakes or other bodies of water are considered to be incapable of supporting normal aquatic life at pH 4.1). Therefore the pond water is a strong biotoxin, which if released can strongly pollute surface and ground waters, surface water including lakes, rivers, and all water that flows on the land surface and ground water being water that has sunken into the ground and resides in or moves through groundwater aquifers. Such pond water contains high dissolved salt, mineral acid, and fluorinated compounds concentrations, as identified in Table 1. The dissolved materials include ammonium, fluorosilicic acid ($H_2SiF_6$), hydrofluoric acid, fluorine, and sulfur tetrafluoride.

TABLE 1

Phosphoric Acid Process Water Research Background Information. From the Florida Institute of Phosphate Research website <http://www.fipr.state.fl.us/>

| Parameter | Untreated Process Water |
|---|---|
| Density (MDS) | 1.03–1.05 |
| Lab pH | 2.1 |
| Conductivity (µmhos/cm) | 22,100 |
| Turbidity (NTU), 24 hours | — |
| Turbidity (NTU), 72 hours | — |
| Lab Turbidity (NTU) | 0.9 |
| Color (Pt/Co units) | 300 |
| Calcium, Ca (mg/l) | 538 |
| Magnesium, Mg (mg/l) | 223 |
| Sodium, Na (mg/l) | 2260 |
| Potassium, K (mg/l) | 210 |
| Iron, Fe (mg/l) | 59 |
| Manganese, Mn (mg/l) | 15 |
| Total Chloride, Cl (mg/l) | 140 |
| Total Fluoride, F (mg/l) | 4120 |
| Sulfate, SO4 (mg/l) | 6200 |
| Total Phosphorus, P (mg/l) | 6600 |
| Ammonia Nitrogen, N (mg/l) | 1240 |
| Acidity, CaCO3 (mg/l) | — |
| Alkalinity, CaCO3 (mg/l) | — |
| Solids, Total Dissolved (mg/l) | 39,800 |
| Solids, Total Suspended (mg/l) | 22 |

In Florida, the average yearly rainfall and the pond evaporation rate are approximately equal, according to Florida Institute of Phosphate Research, and it is normally possible to operate an industrial chemical complex with a negative water balance by strict control of the water inputs to the ponds. However, in a year where rainfall is significantly above average or where water management practices fail to sufficiently reduce water inventory, it may become necessary to treat the surplus water and release it to the surface waters in order to avoid an uncontrolled discharge of the untreated process water.

Present treatment practice is to "lime" the water (i.e., add lime to it) to obtain a pH of approximately 4.5; remove the solids formed; lime the water again to a pH of approximately 11; remove the solids formed; air strip the water to remove ammonia; and add sulfuric acid to reduce the pH to approximately 6.5. Although the water will still contain dissolved solids and have a conductivity above discharge standards, under emergency situations it can be discharged to the surface waters under an emergency permit from the Florida Department of Environmental Protection. Unfortunately, the residual dissolved salts in industrial pond water present hazards to public health and the environment, and a significant release of pond water can easily destroy most aquatic organisms. Although a significant emergency release of treated water may not have such severe results, it can still cause significant biodegradation and environmental impact.

Thus, there is significant need to control total volume of such industrial pond waters.

In addition to the double-liming technique explained above, two other techniques typically are used to reduce pond water volume along with methods for adjusting the pH of the pond water (double liming).

(1) Evaporation. This is a natural method for reducing the water inventory. Evaporation is widely used in the phosphate industry. Where ponds have a very large surface area, considerable evaporation may occur. Spray techniques can be used to increase evaporation by increasing the surface area of the water. The rate of evaporation is related to the surface area of liquid exposed, the temperature of the liquid, and the relative humidity. In addition, the vapor pressure of pond water is lowered significantly due to elevated dissolved salt concentrations. The lower pond water vapor pressure lowers the rate of evaporation. Further, high humidity, as often exists in Florida, lowers the rate of evaporation; when humidity approaches 100%, little evaporation takes place at all.

Artificial evaporation desalination techniques, such as multi-stage flash techniques, have substantial associated energy costs for heating the pond water (to make the process more efficient in terms of the percentage of water that can be evaporated from a particular volume of water). In addition, because the untreated pond water may be at or close to saturation, evaporation will lead to the formation of large amounts of crystallized scale, which can clog the installation apparatus and render the process less efficient. Thus, application of artificial evaporation desalination techniques appears to be impractical, without prior treatment to lower the pH by causing substantial precipitation of dissolved and suspended matter.

(2) Conventional desalination, Reverse Osmosis (RO). This method is also being used in at least one trial installation to reduce pond water inventory. Osmosis is a natural phenomenon in which a liquid—water, in this case—passes through a semi-permeable membrane from a relatively dilute solution toward a more concentrated solution. This flow produces a measurable pressure, called osmotic pressure. If pressure is applied to the more concentrated solution, and if that pressure exceeds the osmotic pressure, water flows through the membrane from the more concentrated solution toward the dilute solution. This process, called reverse osmosis (RO), removes up to 98% of dissolved solids, and virtually 100% of colloidal and suspended matter.

The membrane must be physically strong to stand up to high osmotic pressure—in the case of seawater, about 2500 kg/m2. After filtration to remove suspended particles, incoming water is pressurized to 200-400 psi (1380-2760 kPa), which exceeds the water's osmotic pressure. As a result, a portion of the water (the permeate) diffuses through the membrane, leaving dissolved salts and other contaminants behind with the remaining water with which they are sent to drain as waste (the concentrate).

RO has a number of well-known limitations, especially in highly saline water and with dissolved solids at or near their saturation limit. A significant limitation with RO treatment of highly saline or highly chemically saturated water is membrane fouling from suspended particulates and scaling. Pond water is a saturated or nearly saturated solution of many salts. Cooling the water or raising the concentration by removing water initiates precipitation of dissolved materials, and scaling of the RO membranes will result. Therefore, RO treatment of the highly saturated pond water requires pretreatment to prevent scaling.

In addition, the little-used desalination method of freezing has been suggested for treating waste pond water. However, this method is very energy-intensive, especially if rapid freezing and subsequent melting is required, in part because the high volume of dissolved solids lowers the freezing point substantially. Also, rapid freezing causes poor rejection of dissolved solids, which can be accommodated within the hexagonal crystal structure of ice. Additionally, residual brines can be overgrown and trapped between ice crystals. Furthermore, in a hot and humid region such as Florida, pond water freezing would be prohibitively expensive.

There is thus strong need for a more versatile, cost-effective technique to decontaminate and reduce industrial pond waste water inventories. Furthermore, there are numerous other processes in which significant volumes of water need to be removed from aqueous or other water-containing products. For example, drying and concentration of food products intended for human or animal consumption is an important part of many industrial processes. Many types of food products such as orange juice, condensed milk, evaporated skim milk, powdered milk, powdered whey, amongst other food products, are concentrated by evaporation, in which considerable amounts of heat must be applied to drive off water.

In the case of dairy and other food products, heat is commonly applied under partial vacuum conditions to lower the boiling point; otherwise, the food will be spoiled, which would require its disposal, or it will have an undesirable cooked flavor. In the case of milk, the temperature must be controlled accurately. Milk is commonly heated under a vacuum that is deep enough to cause the milk to boil at between 40-45° C., and the milk is concentrated to approximately 30% solids concentration under essentially fluid conditions. This concentrated milk is either removed as a relatively viscous fluid, for packaging or other processing that does not involve further concentration, or it is further dried. Alternatively, dry powdered mild is produced through spray evaporation at 200° C. in a chamber filled with hot gas that causes the milk to form small, non-aggregated particles. The powdered milk has less than 5% water content.

Concentrated orange juice and other citrus, fruit, and vegetable concentrates are also produced by evaporation. Sometimes, but not always, the evaporation process also uses reduced pressure evaporators. However, fruit and vegetable juices are more resistant to spoiling when temperatures are raised for evaporative processes. Thus, if reduced pressure is used, the vacuum need not be so deep, and hence as expensive to produce, but the amount of heat that has to be applied is greater. Throughout the process of evaporation, the rate of evaporation slows as the material becomes more concentrated. Lowering of vapor pressure effect is a colligative property that acts broadly throughout the fluid because of the distribution of hydraulic pressure. As concentration increases, the vapor pressure of the water in the fruit or vegetable juice lowers linearly, and more heat must be applied to drive the evaporation process and remove more water. Evaporation thus becomes less efficient under conditions of increasing concentration.

Because of the requirement to apply considerable heat over short periods of time, and often under conditions where vacuum pumping must be carried out continuously, present concentration processes add significant cost to the concentrated food production process. Moreover, the efficiency of the process can decrease significantly with increasing concentration, as noted above. Accordingly, a process for concentrating aqueous or other water-containing food products that does not require such levels of heat input, and that generally remains efficient, is desirable.

BRIEF SUMMARY OF THE INVENTION

In one regard, the invention provides an efficient, cost-effective technique for reducing the volume of industrial waste waters, e.g., water held in industrial holding ponds. In particular, according to the invention, hydrate is formed in the waste water (either directly in the pond itself or in a separate facility or installation) and is then removed. The hydrate extracts fresh water from the waste water, so removing the hydrate reduces the volume of the waste water. Fresh water released when the hydrate dissociates (melts) may be pure enough to release to ordinary surface waters, either directly or after minor post-processing (e.g., chemical polishing or RO), and the residual brine will be of significantly elevated concentration of dissolved materials. The elevated concentration of the residual brine is sufficient to permit the residual brine to be used as an industrial feedstock for the basic, underlying process in connection with which the waste water was produced. Thus, cost savings can be realized by returning significant amounts of one or more of the original reagents to the industrial process in the residual brine.

Additionally, elevating the concentration(s) of any of the various dissolved species in the residual fluid to saturation levels by removing water from the solution causes the dissolved materials to precipitate out of the solution. For example, in the embodiment of the invention described below (that specific embodiment being for illustrative purposes and not intended to be limiting in nature), in the case of phosphate ponds, the material that crystallizes out of solution will be gypsum and phosphogypsum ($PCaSO_4$). This precipitated material is collected and stored on site or used for other suitable purposes. For example, precipitated gypsum and phosphogypsum can be used in roadbeds or for the manufacture of gypsum wallboard. Thus, controlled production of solid precipitate optimizes or makes more profitable the overall manufacturing process.

Thus, according to a first aspect, the invention features a method of treating a highly polluted or otherwise contaminated solution including water and one or more solutes dissolved therein, where the solution is a byproduct of an industrial process. The method includes mixing a hydrate-forming substance with the solution under pressure and temperature conditions suitable for hydrate to form, so that hydrate of the hydrate-forming substance forms and removes water from the solution. This produces a residual fluid having higher concentration of the various solutes than the solution being treated. The hydrate is removed from the residual fluid, and the elevated concentration residual fluid is provided back to the industrial process as an industrial feedstock to provide the various solutes back to the industrial process.

In another aspect, the invention features method of treating a highly polluted or otherwise contaminated solution including water and one or more solutes dissolved therein, where the solution is a byproduct of an industrial process. The method includes mixing a hydrate-forming substance with the solution under pressure and temperature conditions suitable for hydrate to form, so that hydrate of the hydrate-forming substance forms and removes water from the solution. This produces residual fluid having higher concentration of the various solutes than the solution being treated. The hydrate is removed from the residual fluid. Additionally, sufficient amounts of water is removed from the solution via the hydrate to raise the concentration of the various solutes in the residual fluid to saturation levels. As a result at least one of the various solutes precipitates out of the residual fluid, and the precipitated solute(s) can be collected and put to other uses, as desired.

In either case, the hydrate may be dissociated to release relatively pure water and the hydrate-forming substance. The water may be released to surface waters or returned to the solution being treated, as appropriate, and the hydrate-forming recaptured for further cycles of the hydrate-forming process.

In another regard, the invention provides an efficient technique for concentrating aqueous and other water-containing food products, such as (but not limited to) milk and fruit or vegetable juices. According to this aspect of the invention, a food product in relatively liquid or fluid form is mixed with hydrate-forming material under pressure and temperature conditions suitable for hydrate to form, and the hydrate extracts water from the food product. Hydrate is removed and melted to release water (which may be used as potable water) and the hydrate-forming substance, and the concentrated food product is then packaged for sale where so desired (e.g., condensed milk) or used for further food manufacturing.

BRIEF DESCRIPTION OF THE DRAWINGS

The invention will now be described in greater detail in connection with the drawings, in which.

DETAILED DESCRIPTION

Hydrate-Based Desalination/Fluid Treatment, Generally

Figure 1:
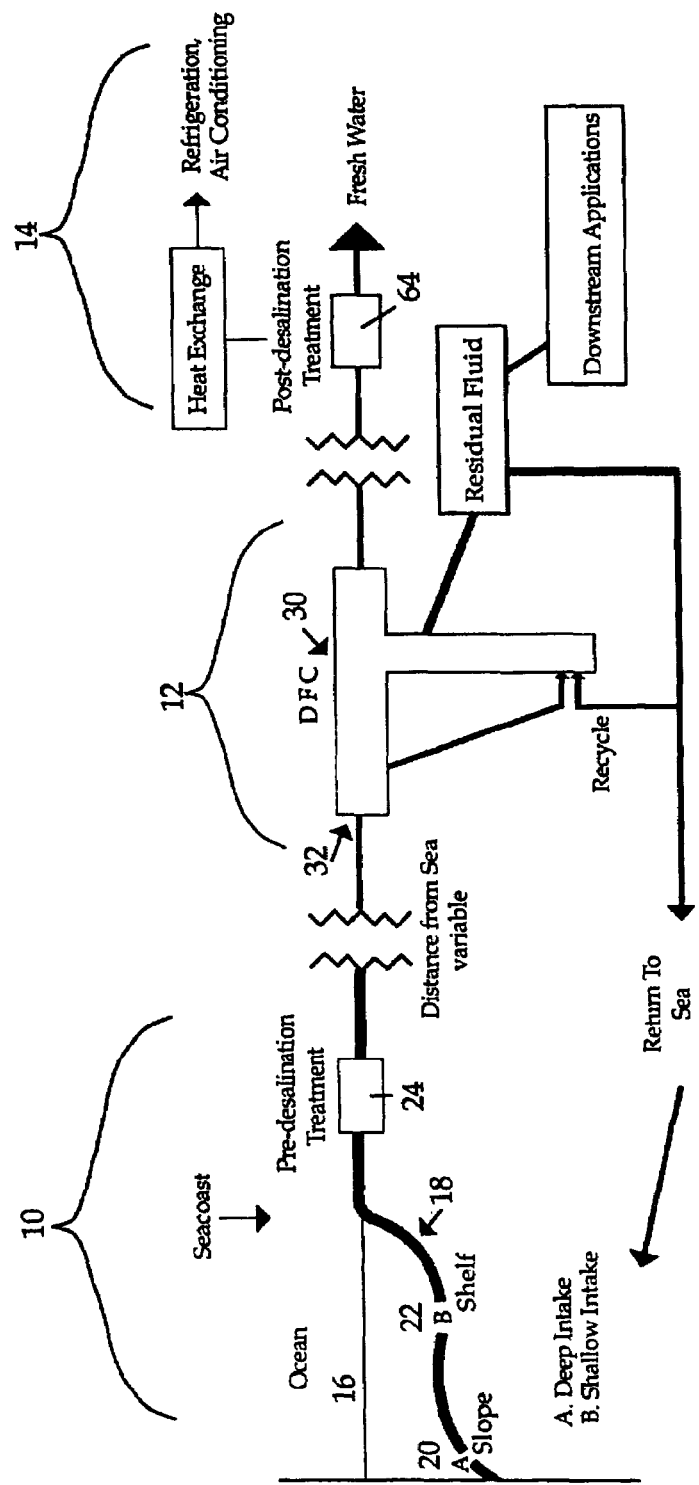
FIG. 1 is a generalized, diagrammatic depiction of a land-based treatment installation.

A land-based installation for desalination or other fluid treatment as per the above-referenced patents is shown schematically in FIG. 1, in generalized fashion. The installation may be divided roughly into three sections or regions: an intake portion 10; a water purification portion 12; and post-processing and downstream usage section 14.

In the context of desalinating seawater to produce potable water, the intake portion 10 consists essentially of the apparatus and various subinstallations necessary to extract seawater from the ocean 16 and transport it to the desalination/purification installation at region 12, including subaquatic water intake piping 18 and pumping means (not shown) to draw the water from the ocean and pump it to shore for subsequent processing. Large volume installations can be located relatively close to the sea to reduce the piping distance of the input water to a minimum, and establishing the installation as close to sea level as possible will reduce the cost of pumping against pressure head.

The intake pipeline 18 preferably extends sufficiently out to sea that it draws deep water, e.g., from the slope 20 of the continental shelf because deep water is more pure and colder than shallow water. Alternatively, water may be drawn from locations closer to land, e.g., from areas on the continental shelf 22 where the distance across the shallow water is too great for practice. The precise depth from which water is drawn will ultimately be determined by a number of factors, including primarily the specific embodiment of the desalination fractionation column which is employed, as described below. Ideally, the desalination installation, per se, is located so that the highest part of the fluid-handling system is at or below sea-level to reduce the costs of intake pumping.

Additionally, the water may be pretreated at a pretreatment station 24. Pretreatment consists mainly of de-aeration, filtering to remove particulate matter and degassing, consistent with the requirement that material necessary for hydrate nucleation and growth not be removed from the water.

Figure 2:
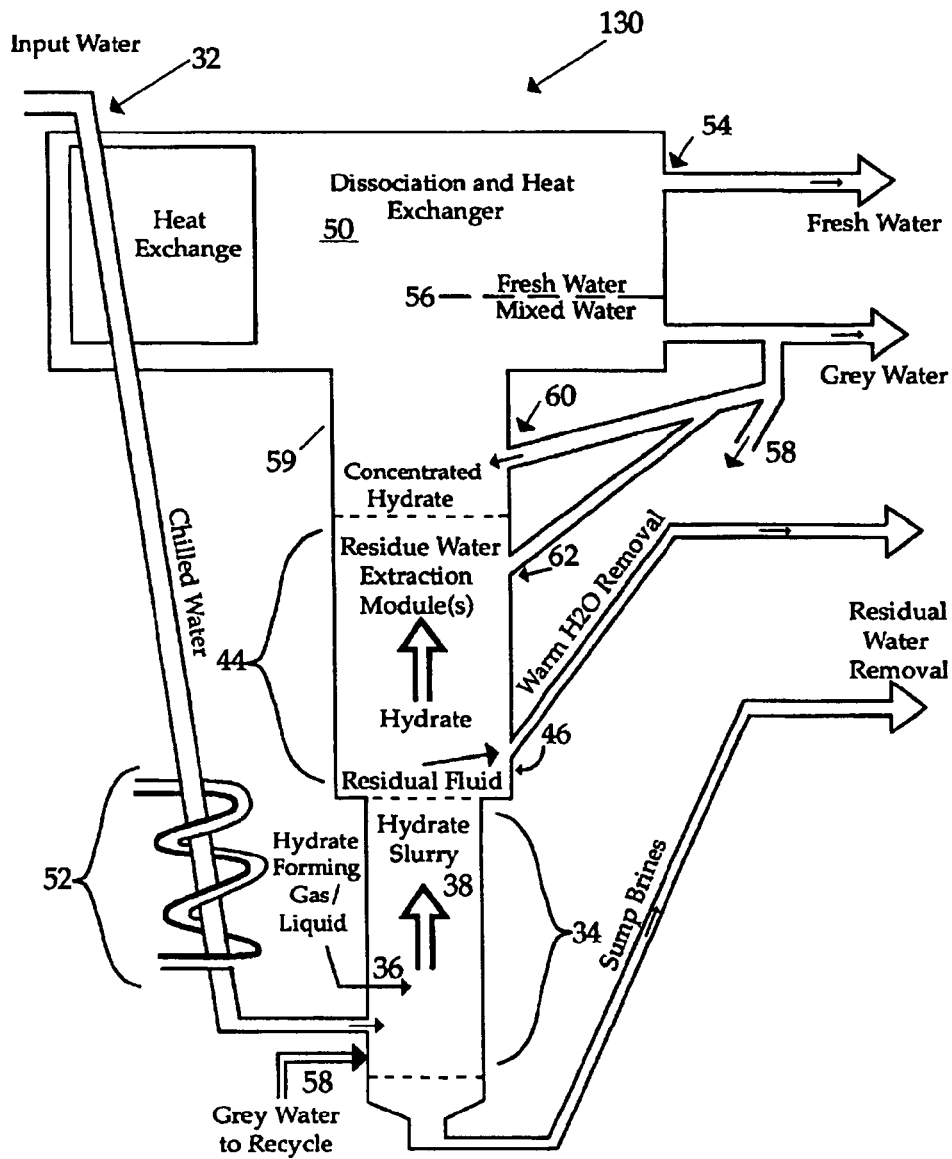
FIG. 2 is a diagrammatic, side elevation view of an embodiment of a hydrate fractionation column which utilizes positively buoyant hydrate and which may be employed in the installation shown in FIG. 1.
Figure 3:
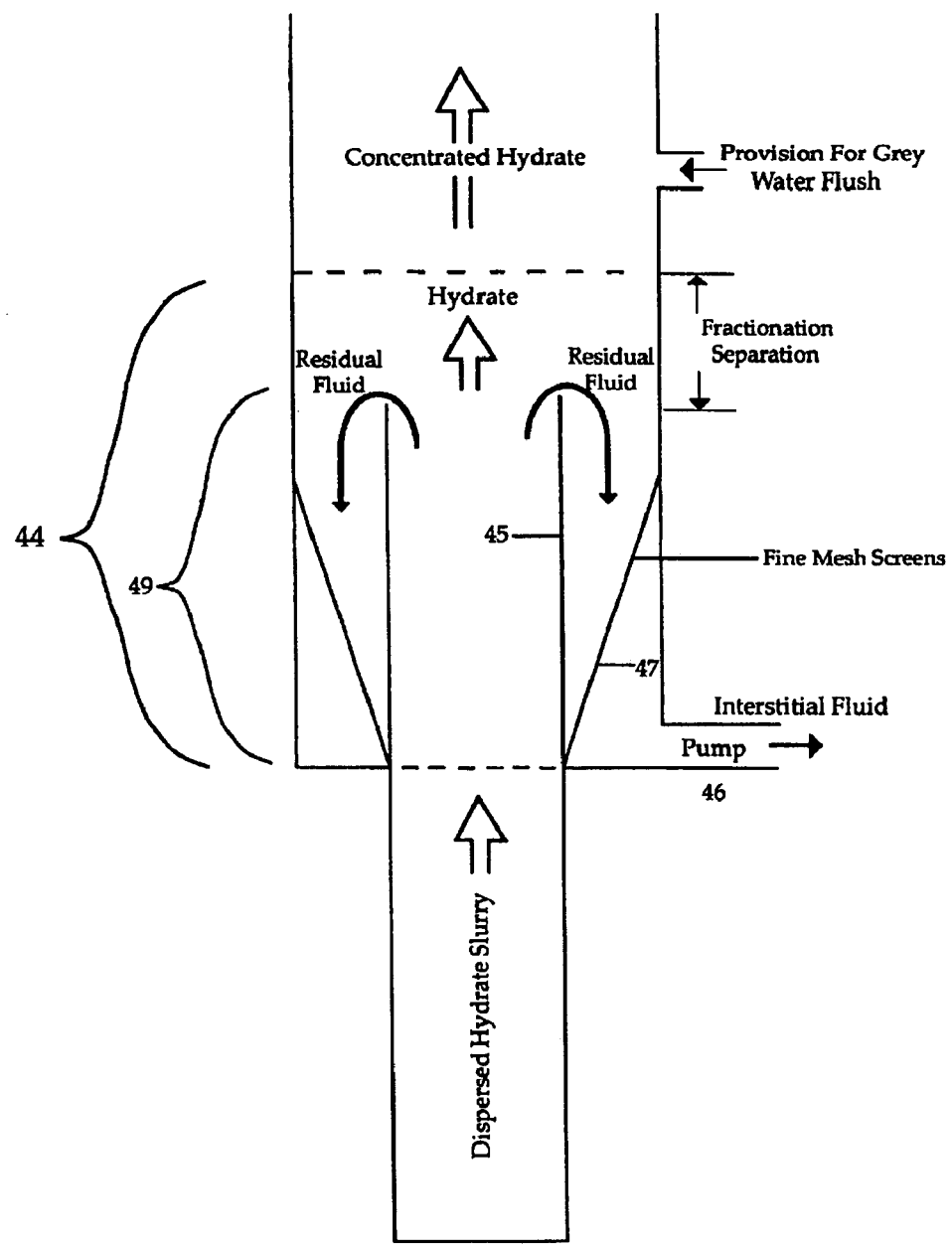
FIGS. 3 and 4 are diagrammatic, side elevation views showing two alternative heat extraction portions of a desalination fractionation column employed in the installation shown in FIG. 1.
Figure 4:
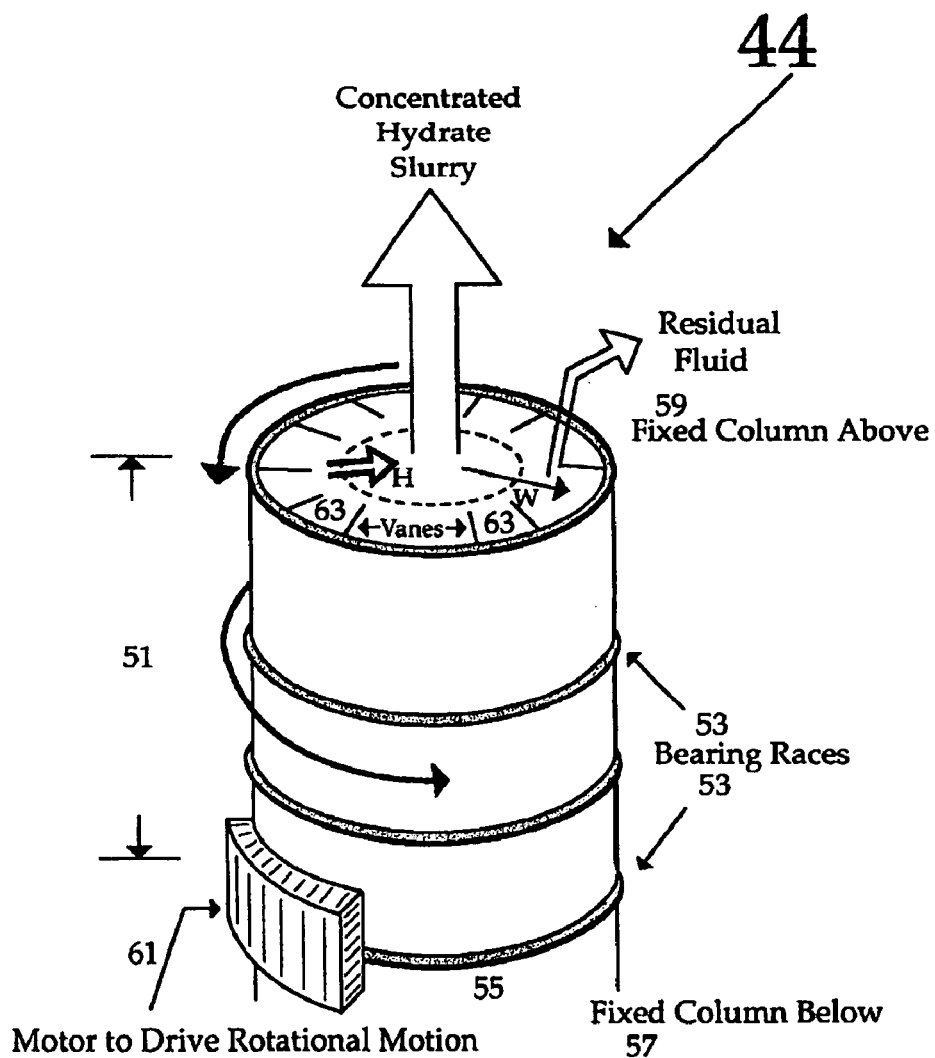

One embodiment of the purification installation 30, per se, is illustrated in FIGS. 2, 3, and 4, which embodiment utilizes positively buoyant hydrate to extract fresh water from seawater. Seawater is pumped into the installation 130 at water input 32 and is pumped down to the lower, hydrate formation section 34 of the installation. The bottom of the hydrate formation section is no more than about 800 meters deep, and perhaps even shallower (again depending on the particular gas or gas mixture being used). A suitable, positively buoyant hydrate-forming gas (or liquid) is injected into the hydrate formation section at 36, and positively buoyant hydrate 38 spontaneously forms and begins to rise through the water column, as is known in the art.

The hydrate-forming gas can be pumped using sequential, in-line, intermediate pressure pumps, with the gas conduit extending either down through the fractionation column, per se, or down through the input water line so that gas line pressure is counteracted by ambient water pressure. As a result, it is not necessary to use expensive, high pressure gas pumps located on the surface. Alternatively, once a gas has been liquefied, it can be pumped to greater depths without further significant compression.

Hydrate formation (crystallization) is an exothermic process. Accordingly, as the positively buoyant hydrate forms and rises automatically through the water column—forming a hydrate "slurry" as hydrate crystals continue to nucleate and grow as they rise, until the hydrate-forming gas is used up—the surrounding water, which will increasingly become a concentrated saline "residue," will be heated by the heat energy released during crystallization of the hydrate.

Below a certain salinity, the heated residual seawater will have a relatively decreased density and will rise in the column along with the hydrate 38. When the salinity of the residual seawater rises high enough due to the extraction of fresh water from it, however, the highly saline residual seawater will sink to the bottom of the water column. This highly saline residual seawater is collected in sump 40 at the bottom of the fractionation column and is removed.

As the slurry of hydrate and heated residual seawater rises in the fractionation column, heated residual seawater is removed from the system in heat extraction portion 44 of the fractionation column at one or more points 46. The heat extraction section 44 is shown in greater detail in FIG. 3. As illustrated in FIG. 3, for one mode of separation of hydrate and slurry, water is pumped from the system as part of the vertical fractionation process. This is accomplished through a two-stage process. An internal sleeve 45 allows a primary separation to take place, as a water trap 49 is formed below the top of the sleeve. Hydrate continues to rise, while water floods the entire section 44. Water is pumped from below the level at which hydrate exits from the top of the sleeve through fine conical screens 47. These are designed to obstruct the passage of particulate hydrate. (The screens can be heated periodically to clear them of hydrate when flow restriction exceeds design limits.) Residual water is drawn off at a slow enough rate that any hydrate that may reside within water drawn toward the screen has a greater tendency to rise buoyantly than the tendency toward downwards or sideways movement associated with the force of suction of the drawn-off water. Very buoyant gas rises and stays within the column.

An alternative configuration 44' of the heat extraction zone is shown in FIG. 4. In this configuration, a centrifuge is used to allow a separate, mechanically-driven density fractionation system to operate. In this configuration, a segment 51 of the column is made mobile and capable of rotary movement. The mobile, rotary centrifuge column segment is carried by bearings 53 at the base 55 and at intervals along its height to keep it in vertical alignment with the entirety of the column, and to allow it to rotate with respect to the portions 57, 59 of the column above and below it. This section is motor-driven, using a hydraulic system 61 driven from the surface. Vanes 63 within the centrifuge section will cause the water column to rotate, which vanes are designed based on turbine vane design to cause the hydrate-residual water in the section to rotate without turbulence and with increasing velocity toward the top of the section where residual water is extracted. Gravity "settling" or fractionation works here in a horizontal plane, where the heavier residual water "settles" toward the sides of the column while the lighter, more buoyant hydrate "settles" toward the center of the column. The hydrate continues to rise buoyantly and concentrates in the center of the centrifuge section. It will be appreciated that more than one such centrifuge section may be employed.

As the hydrate rises into the upper, dissociation and heat exchange region 50 of the desalination fractionation column, the depth-related pressures which forced or drove formation of the hydrate dissipate; accordingly, the hydrate, which is substantially in the form of a slurry, will be driven to dissociate back into the hydrate-forming gas (or mixture of gases) and fresh water. However, regardless of the particular method used to extract the warmed residual seawater, heat energy in the surrounding seawater which ordinarily (i.e., in the prior art) would be absorbed by the hydrate as it dissociates is no longer available to the hydrate. Therefore, because heat has been removed from the system by extracting warmed residual seawater in the heat extraction portion 44 of the apparatus, a net or overall cooling bias is created in the upper, dissociation and heat exchange portion 50 of the installation.

This cooling bias is capitalized upon to significant advantage. In particular, as indicated schematically in FIG. 2, water being pumped into the system (at 32) is passed in heat-exchanging relationship through the regions of dissociating hydrate. For example, it is contemplated that the dissociation and heat exchange portion 50 may be constructed as one or more large, individual enclosures on the order of one hundred meters across. The input water will pass via a series of conduits through the regions of dissociating hydrate and will be cooled significantly as it does so. In fact, although some initial refrigeration will be required at start-up of the process, which initial refrigeration may be provided by heat exchange means 52, the installation eventually will attain a steady-state condition in which the amount of heat energy transferred from the input water to the dissociating hydrate is sufficient to cool the input water to temperatures appropriate for spontaneous formation of hydrate at the particular depth of the dissociation column.

Ideally, the input water is stabilized at 4° C. or below. This is because below that temperature, the density of the water increases, which enhances separation of the hydrate-water slurry formed by injections of the gas. Additionally, at a given pressure, hydrate nucleation proceeds faster at colder water temperatures. During the start-up period, the system is run in a mode of maximum warm fluid extraction (to create a state of induced thermal bias) before equilibrium or steady-state is reached; although the duration of this start-up period will vary depending on the particular installation parameters, the design goal is that once steady-state is reached, the system can be run for extremely long operating periods without being shut down, i.e., periods on the order of years. Controlling residue water (brine) extraction, and thus heat removal, maintains a steady-state condition so that the apparatus does not keep cooling to below steady-state operating conditions.

Once the hydrate has dissociated into its constituent fresh water and gas or gases, the fresh water is pumped off, e.g. as at 54, and the gas is captured and recycled. (Provisions may be made for liquefying certain gases where this is desired.) Additionally, a portion of the water in the dissociation and heat exchange region 50 will be "gray water," which is fresh water containing some small portion of salts that have been removed from the hydrate by washing of the hydrate with water. The distinction between the "gray" or mixed water and pure fresh water is indicated schematically by dashed line 56. The gray water may be suitable for drinking, depending on the salt concentration, or for agricultural or industrial use without further processing. The cold, gray water may be recycled back into the fractionation column, either by pumping it back down to the hydrate formation section 34, as indicated at 58; or it may be injected back into the concentrated hydrate slurry at a region of the fractionation column located above the heat extraction portion 44, as indicated at 60, to increase the fluid nature of the hydrate slurry and to aid in controlling overall thermal balance of the system. Furthermore, providing gray water at 62 to dilute residual interstitial fluid allows for pre-dissociation washing.

As further shown in FIG. 1, in the post-processing and downstream usage section 14, the fresh water preferably is treated by secondary treatment means 64. The secondary treatment means may include, for example, fine filtering, gas extraction, aeration, and other processing required to bring the water to drinking water standard.

Moreover, it is extremely significant that depending on operating parameters such as temperature of the source water, the amount of residual seawater extracted in the heat extraction section 44, dimensions of the installation, and other parameters such as viscosities of fluids within the system; buoyancy of the hydrate relative to all fluids within the system; salinity and temperature of residual water; the design output requirements of fresh water; salinity and temperature of input water; design cooling requirements; system inefficiencies affecting thermal balance; etc., the fresh water produced will be significantly cooled. This cooled water can be used to absorb heat from other applications or locations such as the insides of buildings, and hence can be used to provide refrigeration or provide for air-conditioning.

Finally, once the seawater has been cycled through the desalination fractionation column and downstream processing applications a desired number of times, the residual, concentrated seawater (which may be highly saline in nature) is simply pumped back to sea. Alternatively, it may be retained for those who desire it.

With respect to overall design, engineering, and construction considerations for the system, it is contemplated that the desalination fractionation column 130 will be on the order of 15 to 20 meters in diameter, or even larger. Conventional excavation and shaft-lining methodologies common to the mining and tunneling industry can be used in the construction of the column 130. Overall dimensions will be determined based on the total desired fresh water production desired and relevant thermodynamic considerations. For example, one cubic meter of methane hydrate has the capacity to warm about 90 to 100 cubic meters of water by about 1° C. as it forms, and that same cubic meter of hydrate has the capacity to cool about 90 to 100 cubic meters of water by about 1° C. as it dissociates. (Mixes of suitable gases have higher heats of fusion, which makes the process more efficient.) Required cooling therefore will, in part, determine hydrate production rates, and hence dimensions of the system and the choice of gas or gases to meet those production rates.

Preferably, the diameter of the residual fluid removal column segment is larger. This facilitates buoyant, upward movement of the hydrate through the water column while first allowing separation of residue water from the hydrate in the heat extraction region 44, and then dissociation and heat exchange in the dissociation and heat exchange region 50.

The dissociation and heat exchange region 50 may be constituted not just by a single dissociation "pool," as shown schematically in FIG. 2, but rather may consist of a number of linked, heat-exchanging devices in a number of different water treatment ponds or pools. The actual depth, size, throughput, etc. will depend on the production rate, which will depend, in turn, on the temperature of the input water, the particular gas or gas mixture used to form the hydrate, the rate at which heat can be removed from the system, etc.

The input of water into the base of the fractionation column can be controlled by a device (not shown) that alters the input throat diameter so as to facilitate mixing of the gas and water, thereby promoting more rapid and complete hydrate formation. Alternatively or additionally, hydrate formation can be enhanced by creating flow turbulence in the input water, just below or within the base of the hydrate forming gas injection port 36. It may further be desirable to vary the diameter of the desalination fraction column in a manner to slow the buoyant descent of the hydrate slurry, thereby enhancing hydrate formation.

The dissociation and heat exchange region 50 will be significantly wider and larger than the lower portions of the desalination column. This is because hydrate will be floating up into it and dissociating into gas and fresh water at a rate that is faster than that which could be accommodated in a pool that is the diameter of the column itself. Moreover, the requirement for heat will be great; if sufficient heat cannot be provided, water ice will form and disrupt the desalination process. Provision for physical constriction within a column will hold hydrate below the level where it dissociates freely, thus providing for a control on the amount of gas arriving at the surface. This is done for both normal operational and safety reasons.

Because the positively buoyant hydrate used in this embodiment of a hydrate-based fluid processing installation floats, fresh water tends to be produced at the top of the section, thereby minimizing mixing of fresh and saline water. To inhibit unwanted dissociation, the heat exchanger apparatus may extend downward to the top of the residual water removal section. The dissociation and heat exchange pools do not need to be centered over the water column; moreover, more than one desalination fractionation column may feed upward into a given dissociation and heat exchange pool. Similarly, groups of desalination fraction columns can be located close together so as to be supported by common primary and secondary water treatment facilities, thereby decreasing installation costs and increasing economy.

In addition to large-scale installations, relatively small-scale installations are also possible. For these installations, smaller diameter desalination columns can be constructed in locations where lower volumes of fresh water are required. Although overall efficiency of such systems will be lower than larger scale systems, the primary advantage of such small-scale installations is that they can be implemented using standard drilling methods. Furthermore, mass-produced, prefabricated desalination apparatus sections can be installed in the casings of drilled holes; this allows the installation to be completed in a relatively short period of time. Capital cost of such an installation also is reduced, as fabrication of the components can be carried out on an industrialized basis using mass production techniques. The various operating sections of a smaller-scale installation might be replaced by extracting them from their casing using conventional drilling and pipeline maintenance techniques.

Figure 5:
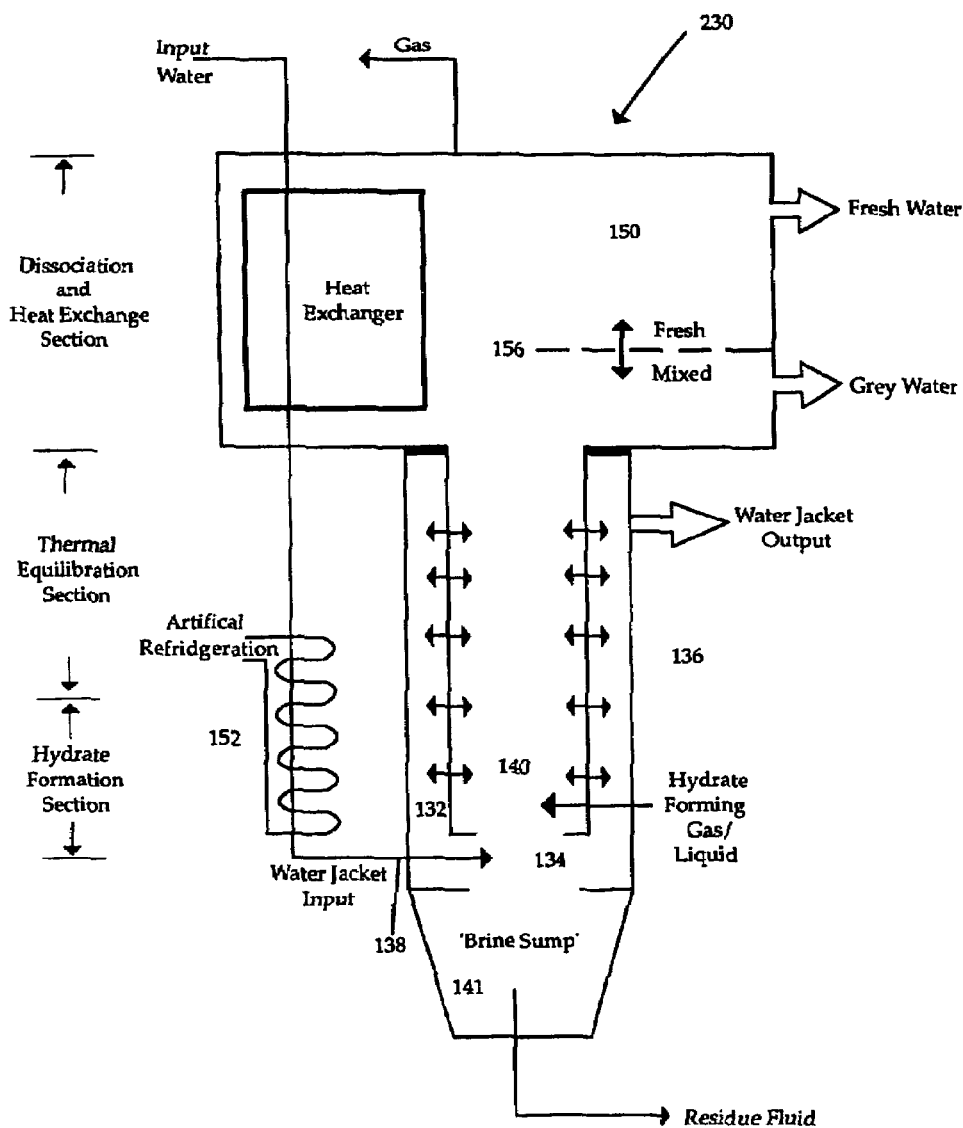
FIG. 5 is a diagrammatic, side elevation view of another embodiment of a hydrate fractionation column which utilizes positively buoyant hydrate and which may be employed in the installation shown in FIG. 1.

An alternate, slightly simplified embodiment 230 of a hydrate-based fluid treatment (e.g., desalination) fractionation column is shown in FIG. 5. In this embodiment, hydrate formation occurs essentially within a thermal equilibration column 132. The thermal equilibration column 132 has an open lower end 134 and is suspended in shaft 136. In this embodiment, input water is injected near the base of the desalination column 132, e.g. as at 138, preferably after passing through heat exchange and dissociation region 150 of the column 230 in similar fashion to the embodiment shown in FIG. 2. Positively buoyant hydrate-forming gas is injected into the lower portions of the thermal equilibration column 132, as at 140, and hydrate will form and rise within the column 132 much as in the previous embodiment.

The embodiment 230 is simplified in that heat of formation of the hydrate is transferred to water surrounding the thermal equilibration column 132 within a "water jacket" defined between the walls of the column 132 and the shaft 136 in which the desalination fractionation column is constructed. To this end, the hydrate formation conduit preferably is made from fabricated (i.e., "sewn") artificial fiber material, which is ideal because of its light weight and its potential for being used in an open weave that greatly facilitates thermal equilibration between residual saline water within the thermal equilibration column 132 and seawater circulating within the water jacket.

As is the case with the embodiment shown in FIG. 2, warmed water is pumped out of the system, this warmed water being water which has circulated within the water jacket. In contrast to the embodiment shown in FIG. 2, however, the intent of removing warmed water from the water jacket is not to remove so much heat energy that the input water is automatically cooled to temperatures suitable for formation of the hydrate at the base of the column, but rather it is simply to remove enough heat energy to prevent water within the interior of the hydrate formation conduit from becoming so warm that hydrate cannot form at all. Accordingly, the rate at which warm water is removed from the water jacket may be relatively small compared to the rate at which warm water is removed from the heat extraction portion 44 of the embodiment shown in FIG. 2. As a result, it is necessary to supplement the cooling which takes place in the heat exchange and dissociation region 150 using supplemental "artificial" refrigeration means 152. Operation is otherwise similar to that of the embodiment shown in FIG. 2: fresh water is extracted from the upper portions of the heat exchange and dissociation portion 150; "gray water" is extracted from lower portions of the heat exchange and dissociation region 150, i.e., from below the line of separation 156; and concentrated brine is removed from brine sump 141.

Figure 6:
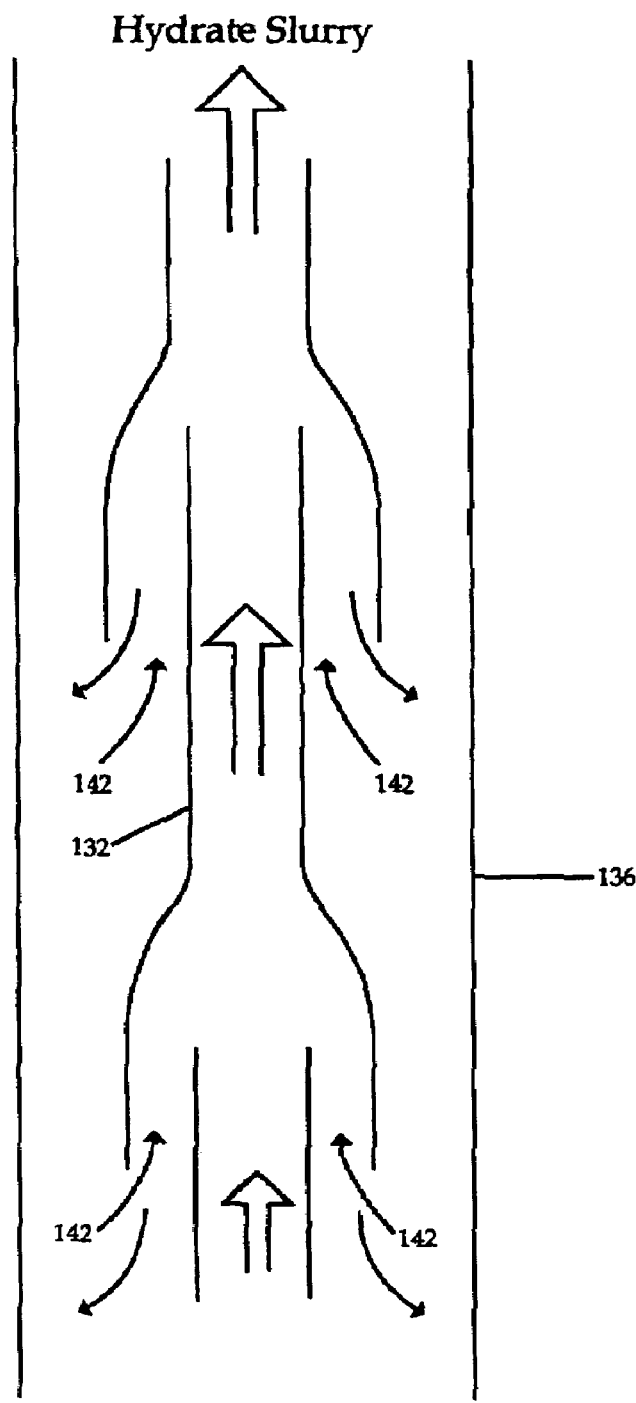
FIG. 6 is a diagrammatic, side elevation view showing overlapping water vents used in the hydrate fractionation column shown in FIG. 5.

To facilitate "settling out" of residual fluid or brine (e.g., salt brine) which is sufficiently dense to be negatively buoyant due to concentration and/or cooling, and to facilitate heat transfer and thermal equilibration, the equilibration column 132 preferably is constructed with overlapping joints, as shown in FIG. 6. This configuration permits the buoyant hydrate to rise throughout the column, while cooled, more saline water can flow out through the vents 142, as indicated schematically.

Figure 7:
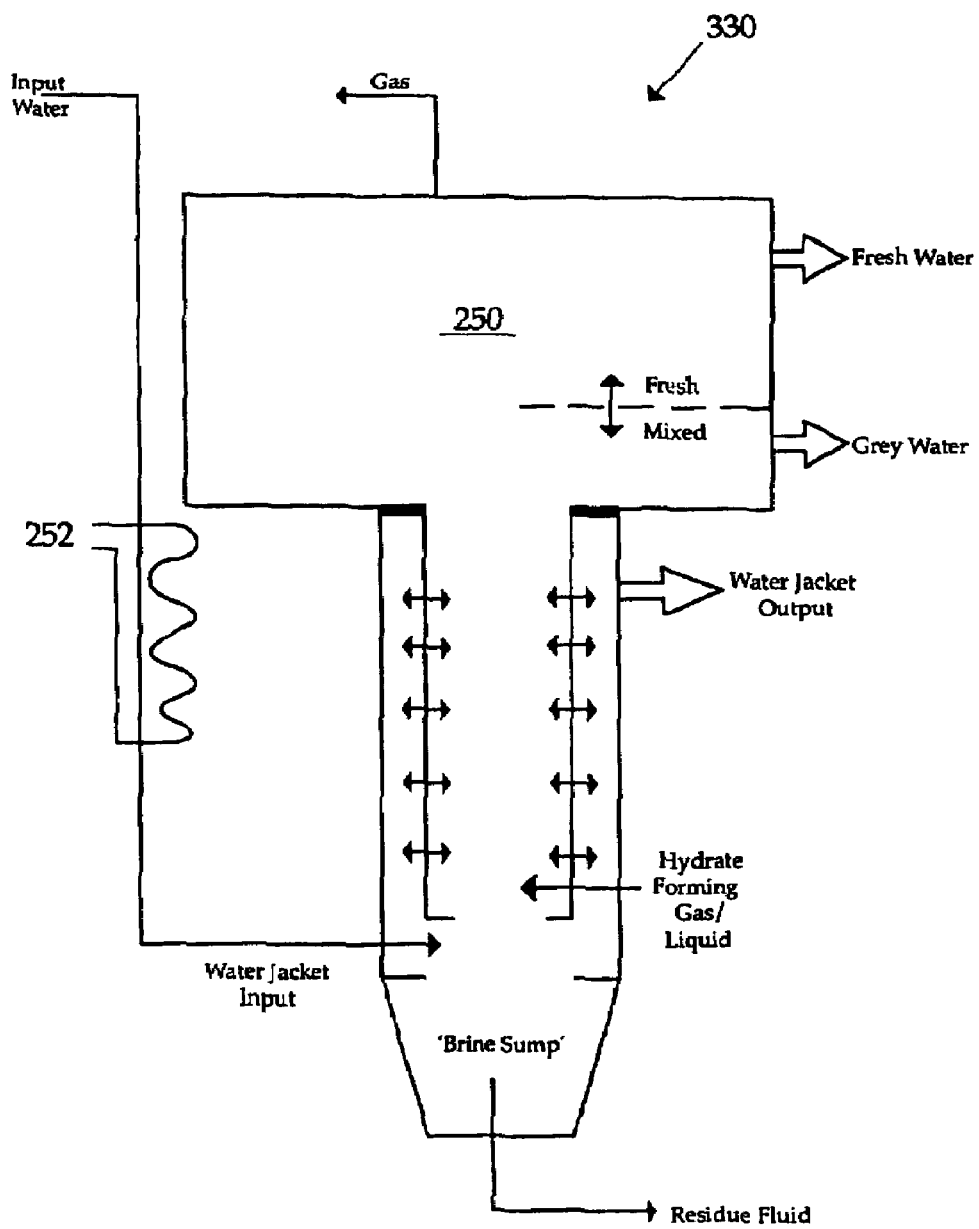
FIG. 7 is a diagrammatic, side elevation view of yet another embodiment of a buoyant hydrate-based fractionation column employed in the installation shown in FIG. 1, which embodiment is similar to that shown in FIG. 5.

The hydrate fractionation column installation may be further simplified by feeding the input water into the system without passing it through the dissociation section 250 of the embodiment 330 shown in FIG. 7. If the input water is not sufficiently cold, more artificial refrigeration will need to be provided by refrigeration means 252, but operation is otherwise the same as embodiment 230 shown in FIG. 5.

Figure 8:
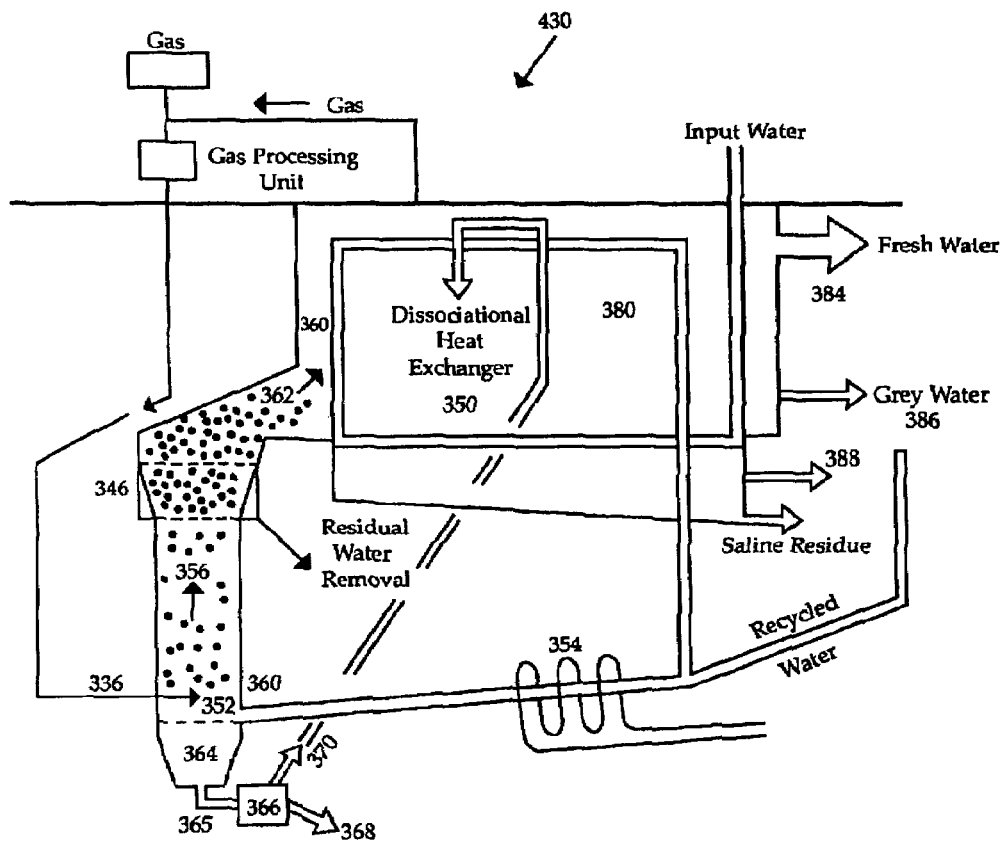
FIG. 8 is a diagrammatic, side elevation view of an embodiment of a hydrate fractionation column which permits the utilization of negatively buoyant hydrate and which may be employed in the installation shown in FIG. 1.
Figure 9:
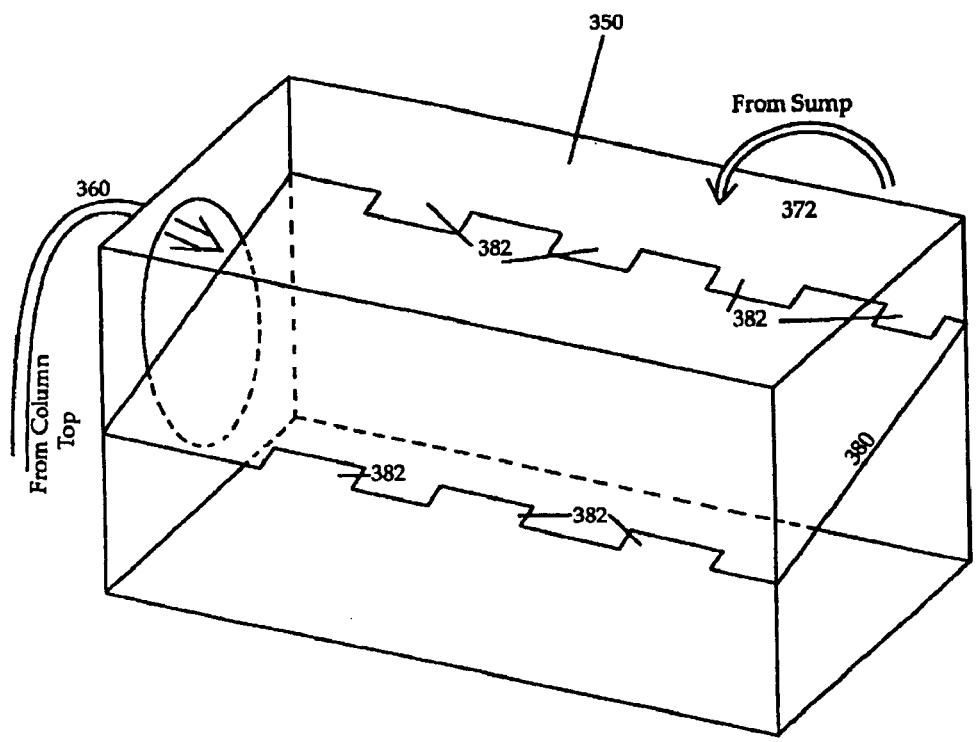
FIGS. 9 and 10 are schematic, isometric and end views, respectively, of the dissociation and heat exchange portion of the hydrate fractionation column shown in FIG. 8.
Figure 10:
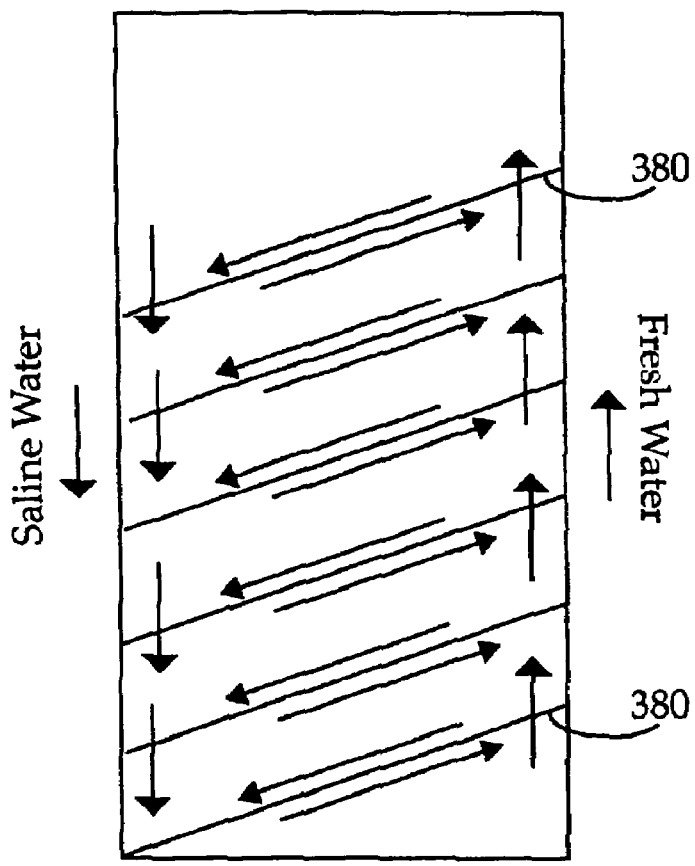

Whereas the embodiments described so far utilize gas or mixtures of gas which form positively buoyant hydrates under appropriate temperature and pressure conditions, the versatility of hydrate-based desalination, purification, or other fluid treatment can be expanded greatly by adapting the methods and apparatus described above to accommodate negatively buoyant hydrates. An embodiment 430 of a hydrate fractionation "column" configured to permit the use of negatively buoyant hydrate for water purification is shown in FIGS. 8-10. The major difference between this embodiment 430 and the preceding embodiments of hydrate fractionation columns is that the heat exchange and dissociation portion 350 of the installation is laterally or horizontally displaced or offset relative to the hydrate formation and heat removal sections 336 and 346, respectively. The hydrate formation and heat removal sections are similar to those in the embodiments described above.

A number of different operating gases can be employed with this configuration. Low molecular weight gases such as $O_2$, $N_2$, $H_2S$, Ar, Kr, Xe, $CH_4$, and $CO_2$ all form hydrates under different pressure-temperature conditions. Each of the different hydrate-forming gas systems will require special design of the hydrate column, which is tailored to the particular gas used in the installation, but the principles of hydrate formation to extract fresh water will remain the same. Additionally, adding small amounts of additive gas(es) to the primary hydrate-forming gas may broaden the hydrate stability field in the same way the methane hydrate stability field is expanded by mixing higher density hydrocarbon gases with methane.

Although a number of different gases that form negatively buoyant hydrate may be used for hydrate-based treatment (e.g., desalination), carbon dioxide and the desalination column in which it is used are described herein to illustrate the design requirements and considerations for a treatment system employing hydrate that is naturally less buoyant than the fluid matrix (e.g., seawater). Carbon dioxide (or carbon dioxide-based gas mixtures, referred to herein simply as "carbon dioxide" for simplicity) is an ideal gas to use for a number of reasons: carbon dioxide does not combust under the physical and thermal conditions encountered in the hydrate desalination apparatus, and is thus virtually hazard-free; carbon dioxide hydrate is stable at shallower depths than methane hydrate (and about the same as mixed gas methane hydrate); even if present dissolved in relatively high concentrations, carbon dioxide is safe for human consumption—in fact, fresh water produced using carbon dioxide can be made so as to retain some quantity of the carbon dioxide, thereby providing soda water that is similar to many popular brands but that is different in at least one significant way: it will contain all the naturally occurring minerals found in seawater in proportion to the remaining salts not removed during the desalination process—and is not offensive to either taste or smell (as would be the case of $H_2S$ hydrate); carbon dioxide hydrate is, like methane, tasteless and odorless; there is considerable recent experimental information which demonstrate clearly the actual marine behavior of the formation and behavior of carbon dioxide hydrate; and carbon dioxide is very common and can be produced locally almost anywhere and is also commonly available as an industrial waste product. (A further advantage of using carbon dioxide as compared to methane or methane mixes is that the higher heat of fusion of carbon dioxide hydrate will heat the residual water more quickly than methane or methane-mixed gases; thus, the induced thermal bias will be higher and the system will operate more efficiently.)

Figure 11:
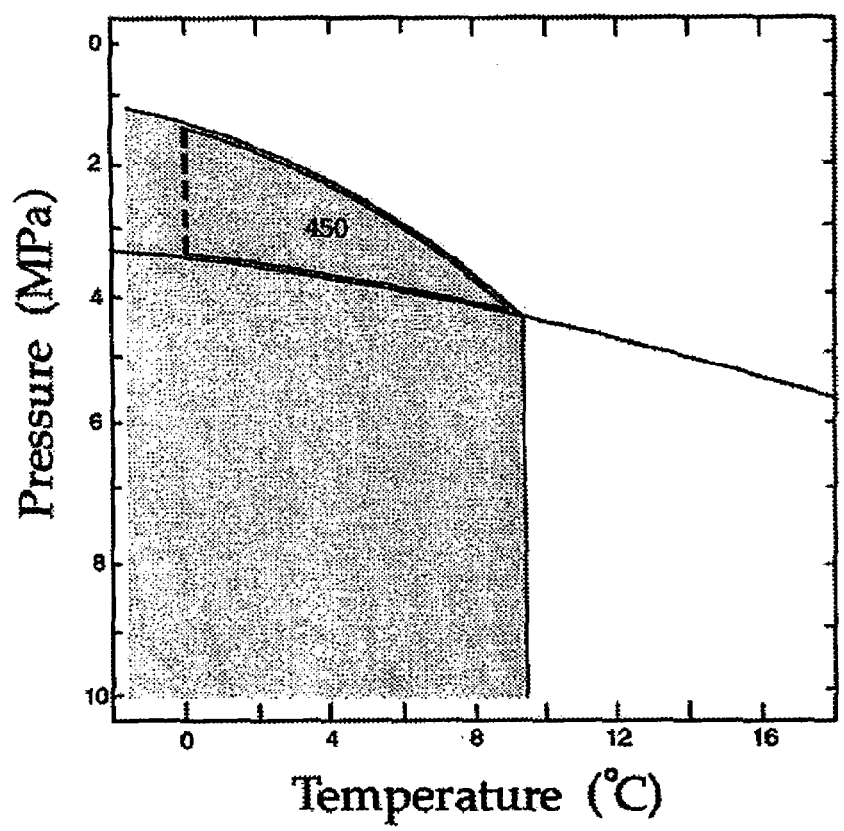
FIG. 11 is a Pressure/Temperature diagram depicting regions of $CO_2$ hydrate stability, the $CO_2$ liquidus, and the operating envelope for a negatively buoyant, $CO_2$ hydrate-based desalination system.

Design and engineering of the hydrate fractionation column will be determined in large measure based on the phase properties of the particular gas being used. FIG. 11 shows, for example, the carbon dioxide hydrate stability regions superimposed over the carbon dioxide phase diagram. The shaded portion of the diagram indicates that carbon dioxide hydrate (formed from carbon dioxide gas) is stable at from an upper pressure limit of about 18 atmospheres, just above 0° C., to about 40 atmospheres pressure at just above about 8° C. With respect to carbon dioxide, per se, the liquidus extends from about 37 atmospheres pressure at just above 0° C., to about 40 atmospheres pressure at just above 8° C. Above the liquidus, carbon dioxide exists as a gas; below the liquidus, carbon dioxide spontaneously compresses to a liquid.

Accordingly, the system is constructed so that, assuming carbon dioxide is used as the operating gas, the carbon dioxide is injected into the hydrate formation portion of the column at ambient temperature and pressure that is within the operating region 450 that consists of the portion of the carbon dioxide hydrate stability zone that lies above the carbon dioxide liquidus and above the freezing point of water. The practical result of this is that the range of water depths at which carbon dioxide may be used as the operating gas is relatively small and is comparatively shallow. Accordingly, a relatively shallow land apparatus can be constructed, which will reduce construction complexity and cost.

Similar to the embodiments described above, carbon dioxide (or other negatively buoyant hydrate-forming gas, as desired) is injected near the base of the hydrate formation section 336 (e.g., at 352) and mixed with supply or input seawater that has been chilled by being passed through the heat exchange and dissociation portion 350 and/or by "artificial" refrigeration, as at 354. The carbon dioxide hydrate will float only if the formation of the hydrate is incomplete such that a complex, hydrate-gas meshwork is formed. This condition is met when the gas is injected rapidly and in relatively large bubbles. The carbon dioxide hydrate isolates carbon dioxide gas bubbles from the surrounding seawater, thereby preventing further formation of hydrate. The combined gas/liquid carbon dioxide and hydrate is positively buoyant, even though the hydrate per se is negatively buoyant (i.e., has a greater specific gravity than the seawater), and floats upward, as at 356. Additionally, some of the bubbles will burst and new hydrate shells will be formed; hydrate shells with gas bubbles predominantly form new carbon dioxide hydrate rims, which are assisted upward by carbon dioxide gas which tends to adhere to solid hydrate particles.

The system is designed to produce as much hydrate as possible, consistent with leaving enough warm, lower-density, residual fluid to form a "flux" and to allow extraction of heat by removing the residual seawater in the heat extraction section 346. The system furthermore has the capacity for very rapid liquid or gas injection, which may be in time-sequence bursts rather than being continuous. It is intended that not all gas form hydrate, as noted above, to ensure incomplete formation of hydrate. Thus, larger quantities of gas are required for a negatively buoyant hydrate-based system than for a complete hydrate-forming gas system such as the positively buoyant hydrate-based systems described above.

As in the case of positively buoyant hydrate-based embodiments, formation of the negatively buoyant (assisted buoyancy) hydrate is exothermic. Accordingly, heat which is given off during hydrate formation warms the surrounding, residual brine, e.g., seawater, which makes the residual seawater more buoyant than the chilled seawater which is being input into the lower part of the column. The residual seawater therefore moves buoyantly upward along with the hydrate as new, denser input water is supplied to the base of the fractionation column, as at 360.

The upward movement of the surrounding residual seawater, along with the original upward movement of the assisted buoyancy hydrate, has a certain momentum associated with it. This carries the hydrate upward through the column until it reaches a lateral deflection zone 362, where the hydrate/residual seawater slurry is diverted horizontally or laterally relative to the hydrate formation and heat removal sections 336 and 346 and into the dissociation and heat removal section 350. Thus, even though some of the hydrate "bubbles" will burst or crack, thereby releasing the carbon dioxide gas contained therein and losing buoyancy, the hydrate in large measure continues to move upward and over into the heat exchange and dissociation region of the column 350 due to this momentum. As the hydrate loses momentum within the heat exchange and dissociation portion 350, it will settle and dissociate into the gas and fresh water, which will separate from residual seawater as described in greater detail below.

Some of the hydrate, however, will form solid masses without entrapped gas and will sink to the lowermost, sump portion 364 of the column. Concentrated brine will also sink to and settle in the sump portion 364. The sunken hydrate and concentrated residual brine are pumped out of the sump at 365 and separated by appropriately configured separation means 366. The waste saline water 368 is disposed of as appropriate, and a slurry consisting of the sunken hydrate is pumped upwardly as indicated at 370 and is discharged into the heat exchange and dissociation chamber 350, e.g. at 372, where the hydrate dissociates into gas and fresh water.

Within the dissociation and heat exchange chamber 350, the hydrate, whether delivered or transported to the chamber via the lateral deflection portion 362 of the column or pumped from the sump of the desalination fractionation column 364, will dissociate into fresh water and the hydrate-forming gas.

To facilitate separation of fresh water from saline water, it is necessary to promote transfer of as much hydrate to the upper part of the dissociation and heat exchange chamber 350 as possible; to hold hydrate as high in the dissociation and heat exchange chamber 350 as possible until dissociation of that volume of hydrate is complete; and to keep mixing of the fresh water produced by dissociation and the more saline residual water to a minimum. The configuration of the dissociation and heat exchange chamber shown in FIGS. 9 and 10 facilitates these objectives.

In particular, the assisted buoyancy hydrate slurry rising through the desalination fractionation column enters the chamber as at 360 after being diverted laterally at deflection portion 362, as indicated schematically in FIG. 9. Additionally, hydrate slurry being pumped from the sump is injected into the dissociation chamber at 372, where it may be placed within special fluid separation devices. The dissociation and heat exchange chamber is constructed with a number of canted separator shelves 380 which extend from one end of the chamber to the other, as well as from one side of the chamber to the other. The canted nature of the shelves allows the denser saline water to sink and the lighter fresh water to rise within and between the shelves, thereby minimizing turbidity and mixing of saline and fresh water. The separator shelves 380 are canted in that they slope downward, both from one end of the chamber to the other as well as from one side of the chamber to the other. The separator shelves have pass-through apertures 382 which allow the denser, saline water to sink within the system and the less dense, fresh water to rise within the system to the top of the chamber as the hydrate dissociates into the fresh water and gas.

Fresh water, which is cooled due to the cooling bias created by the removal of warm residual water as described above in connection with the positively buoyant hydrate embodiments, is removed as at 384 and may be used for cooling as well as for potable water. "Gray" water and saline residue are removed from lower portions of the heat exchange and dissociation chamber 350, as at 386 and 388, and are handled as described above in the context of the positively buoyant hydrate embodiments, e.g., gray water may be used for drinking or industrial applications and the saline residue may be recycled back as input into the base of the desalination fractionation column.

As an alternative to gaseous carbon dioxide, liquid carbon dioxide can be used to form assisted buoyancy hydrate. At the relatively shallow depths appropriate to the formation of hydrate for separation of fresh water, liquid carbon dioxide is more buoyant than seawater (although not as buoyant as gaseous carbon dioxide.) By injecting liquid carbon dioxide energetically into seawater, a resultant meshwork of hydrate and liquid carbon dioxide is formed which is positively buoyant. The meshwork mass will rise spontaneously as a whole immediately upon forming and will behave essentially the same as a hydrate meshwork formed from gaseous carbon dioxide and carbon dioxide hydrate.

(Advantages of liquid carbon dioxide over gaseous carbon dioxide stem from the fact that once the carbon dioxide is compressed, it can be transported to deeper depths without further compression. Thus, injecting liquid carbon dioxide at depths of five hundred meters or more—well below the liquidus—is possible without the need for deep, in-line pumps. Moreover, deeper (i.e., higher pressure) injection of liquid carbon dioxide will promote very rapid crystallization and growth of the hydrate crystals.)

When liquid carbon dioxide is used to form assisted buoyancy hydrate, dissociation is comparatively violent because the unhydrated liquid carbon dioxide trapped within the meshwork produces large volumes of carbon dioxide gas when the mixture rises above the liquidus. Thus, in addition to the carbon dioxide gas released by dissociation of the hydrate (which occurs above the carbon dioxide liquidus), the extra gas produced by conversion of the liquid carbon dioxide to gaseous carbon dioxide has the potential to cause significant turbulence and mixing. Therefore, flow of the hydrate should be controlled such that it enters the dissociation section while still within the hydrate stability field in order to preclude significant dissociation while residual interstitial saline water remains in the slurry.

Additionally, where carbon dioxide liquid is used to form assisted buoyancy hydrate, care should be taken to allow residual fluid to alter its state to gas once the hydrate has risen above the liquidus pressure depth, but while the hydrate remains stable. This will reduce turbulence and mixing when the hydrate finally dissociates.

Figure 12:
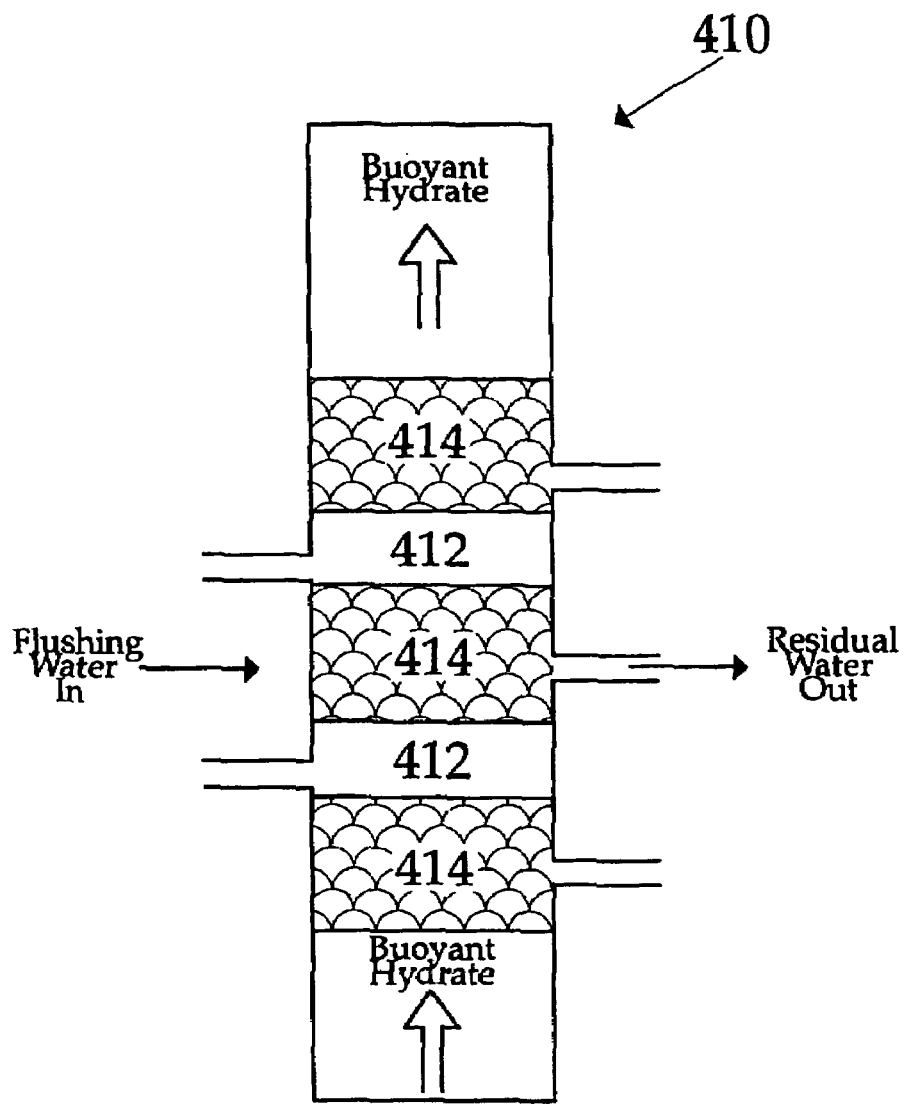
FIG. 12 is a diagrammatic, side elevation view of a residual fluid replacement section designed to facilitate washing of the hydrate slurry.

Ideally, residual saline water should be replaced by fresh water before the hydrate rises into the gas-stable zone and then the dissociation area of the carbon dioxide hydrate phase diagram (FIG. 11). This can be accomplished using multiple water injection points alternatingly arranged between multiple residual or interstitial water removal sections, as illustrated in FIG. 12. In other words, the fluid removal section 44 (FIG. 2) is constructed as an alternating sequence of fresh water injection subsections 412 and fluid removal subsections 414 constructed as shown in either FIG. 3 or FIG. 4. The benefits of removing the interstitial saline fluid include additional heat removal; washing of the slurry (i.e., removal of pollutants or adhering ions or particulate material from the surface of the hydrate crystals) by fluid replacement; and direct removal of saline interstitial water from the hydrate slurry and dilution or replacement of the original saline interstitial fluid produced by the process of hydrate formation.

Although washing of interstitial water is strongly recommended for the slurry mixture of liquid carbon dioxide and carbon dioxide hydrate so as to minimize turbulence and mixing attributable to the liquid carbon dioxide converting to gaseous carbon dioxide, washing the slurry and flushing saline interstitial fluid therefrom would also provide benefits for any positively buoyant hydrate-based or assisted buoyancy hydrate-based system. In particular, injecting cold water (either fresh or gray) from the dissociation section into the hydrate slurry will remove additional heat from the hydrate at the same time that saline interstitial water is flushed from the hydrate slurry. Moreover, multiple residual water flushings will ensure greater fresh water production.

Figure 13:
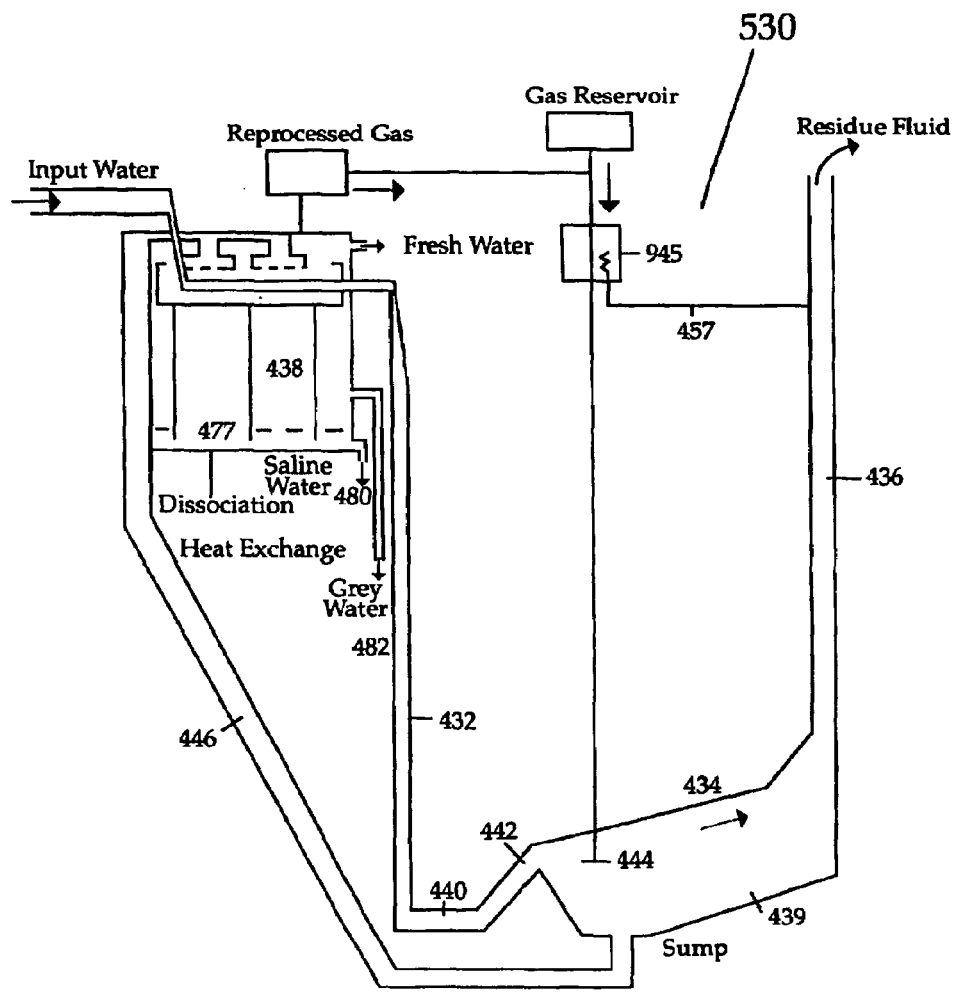
FIG. 13 is a diagrammatic, side elevation view of another embodiment of a hydrate fractionation column which permits the utilization of a negatively buoyant hydrate, which embodiment facilitates separation of residual brines from the negatively buoyant hydrate.
Figure 14:
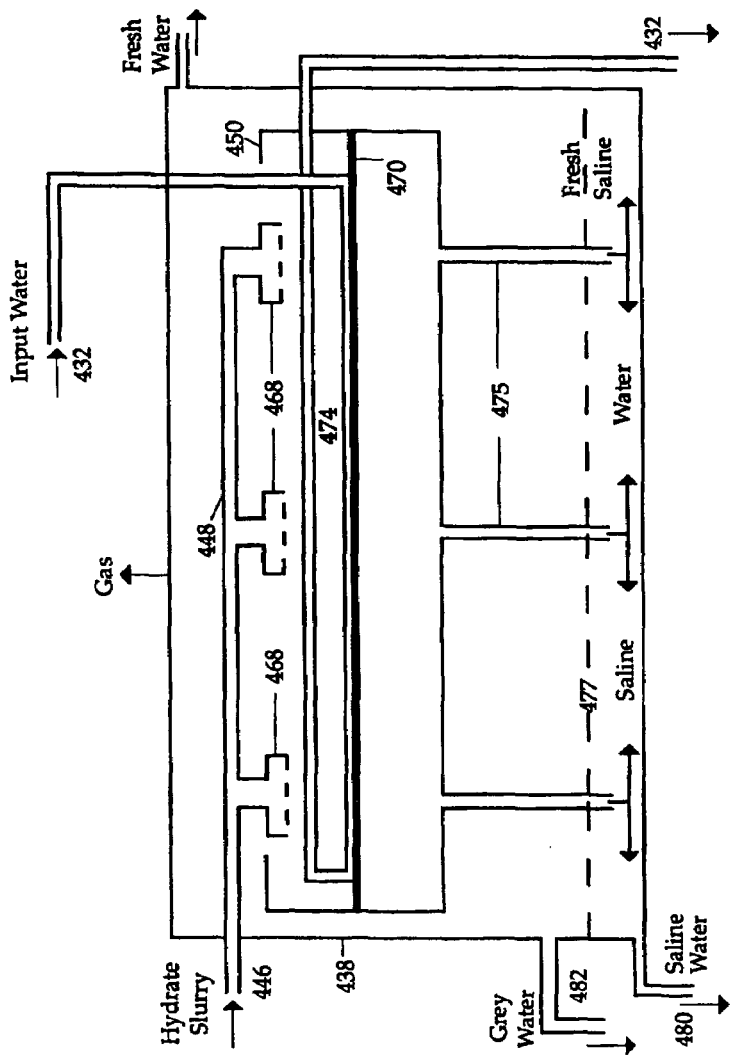
FIG. 14 is a diagrammatic, side elevation view of a slurry-holding, fluid separation apparatus used in the installation of FIG. 13.

Another embodiment 530 of a hydrate fractionation "column" for hydrate-based fluid treatment (e.g., desalination) which is configured to utilize negatively buoyant hydrate and which facilitates separation of the hydrate and residual seawater is illustrated in FIGS. 13 and 14. The "column" is configured as an asymmetric, U-shaped installation, which consists primarily of a seawater input conduit 432, a hydrate formation and catch sump region 434, and a residue fluid riser conduit 436. As in previous embodiments, the seawater input conduit passes through a dissociation and heat exchange region 438 which, in this embodiment, is configured especially as a hydrate "catch basin." As in the previous embodiments, the input water is passed through the dissociation/heat exchange catch basin 438 in heat exchanging relationship with dissociating hydrate in order to chill the input seawater.

The input seawater is pumped to the base 440 of the column, where it turns and flows upward and laterally through elbow portion 442 before entering the hydrate formation and catch sump 434. Negatively buoyant hydrate-forming liquid or gas is injected into the input seawater in the hydrate formation and catch sump at 444. (Means 945 for liquefying certain gases are provided; residual fluid can be used in a heat exchanger 457 to provide cooling for the liquefaction process.) Injection of the gas or liquid is controlled such that hydrate formation is complete (in contrast to incomplete, as in the case of the previously described, assisted buoyancy embodiment), i.e., such that all gas is utilized to form hydrate. The negatively buoyant hydrate settles to the bottom of the catch sump 434. As the hydrate settles, it displaces the residual seawater, which is warmed by the heat liberated during hydrate formation. The residual seawater therefore rises buoyantly through residue fluid riser conduit 436, and it is pumped out of the system to remove heat and create a cooling bias in the system as in the previously described embodiments.

The rate of formation and settling of the hydrate is controlled such that it "packs" down to the point of being grain supported. Mechanical apparatus such as a vibration tray is located on the sloping floor 439 of the settling portion of the hydrate-residual fluid chamber 434. This concentrates the hydrate and minimizes residual fluid remaining so that the hydrate can be pumped rapidly, as a slurry, from the base of the sump up into the dissociation/heat exchange catch basin 438 via slurry pumping conduit 446. The hydrate slurry is pumped to the dissociation/heat exchange catch basin 438 at a rate that is generally faster than the rate at which positively buoyant hydrates rises in the previously described embodiments. Decreasing the time required to transfer the hydrate from the formation region (where it is at its maximum stability) to the dissociation region (where it is at its minimum stability) ensures that a greater proportion of the hydrate will dissociate relatively high in the catch basin. This reduces the amount of mixing of fresh and residue water and increases the relative proportion of fresh water that can be recovered.

Pumped hydrate slurry arrives in the dissociation/heat exchange basin in a concentrated form with little more than intergranular saline water present. Care is taken to allow the saline water to separate downward and fresh water upward so that there is a minimum of mixing. This is achieved by placing a slurry holder and fluid separator tank in the upper part of the dissociation/heat exchange chamber 438. This allows the negative buoyancy hydrate dissociation to take place so that saline water is delivered to and collects in the lower part of the dissociation chamber 438, in which the slurry holder and fluid separator tank is placed, without mixing with fresh water.

An embodiment of a slurry holder and fluid separator consists of a fixed, wide-mouthed, upwardly open tank or tanks 450 (FIG. 14) that receive the hydrate slurry from above. Each tank holds the negatively buoyant hydrate from the hydrate slurry transfer system 446 and prevents it from sinking to toward the base of the dissociation chamber 438. The hydrate slurry is delivered by pipes 448 to a number of hydrate spreaders consisting of vanes or rotating vanes designed to disperse the granular hydrate 468. The negatively buoyant hydrate separates while falling to a screen shelf 470 in the tank. This allows saline water to sink through the screen shelf at the base of the circulating input water intercooler system 474, which transfers heat from the input water to the dissociating hydrate and feeds the cooled water downward to be treated.

A number of residual water delivery pipes 475 extend downward from the base of this slurry holding tank, which allows heavier saline water to flow to the base of the vessel without disturbing the water surrounding these pipes. Thus, even when the fresh water-saline water interface is located in the vessel below the slurry holding tank, no mixing occurs between the residue water purged from each input of hydrate slurry because of a physical separation. The main interface 477 (dashed line) between fresh and saline water will be located somewhere the lower part of the dissociation/heat exchange chamber 438, where saline water naturally collects below fresh due to density differences. Saline water is removed at the base of the chamber 480, and provision is also made for gray water removal as at 482.

Multiple slurry holding tanks may be placed within a given dissociation/heat exchange chamber so that the flow of hydrate slurry can be rapid enough to prevent clogging or freezing up of any one tank. Circulating input water may be passed first through one slurry holding tank and then through another to minimize temperature of the input water as it exits the dissociation/heat exchange chamber.

All fluids will find their relative positions according to natural buoyancy or through a process of fractionation. All internal piping in the vessel can be fabricated from inexpensive plastic or other material. This method of fluid separation may also be installed in the dissociation/heat exchange section of the assisted buoyancy and pumped sump embodiment shown in FIG. 8.

The slurry pumping conduit 446 may be constructed as a variable volume pipe, in order to permit periodic pumping of hydrate without allowing the hydrate to settle or move upward slowly. Such a variable volume pipe can be fabricated relatively easily by inserting a flexible sleeve within the slurry pumping conduit 446 around which fluid can flood when the pressure within the liner is reduced.

The injection point 444 of the hydrate-forming liquid or gas, it will be noted, is positioned above the base of the column 440 so that in the event of incomplete hydrate formation (which would result in the formation of assisted buoyancy hydrate), any excess gas which does not form hydrate (along with assisted buoyancy hydrate) will rise up the residue fluid riser conduit 436. (Very little hydrate will escape with gas up the residue fluid riser conduit 436, and any such hydrate will have dissociated prior to arriving at the top of the residue riser section. Therefore, the amount of fresh water "lost" by being transported by such hydrate will be minimal; recovery of that fresh water is not feasible; and accordingly no connection is provided between the output of the residue fluid riser conduit 436 and the dissociation/heat exchange catch basin 438.)

For proper operation of this embodiment, flow rate controls such as constrictors should be used to keep the rate of flow of fluid through the system low enough to keep solid hydrate from being swept up the residue fluid riser conduit 436. Furthermore, the design of the hydrate formation and catch sump 434, as well as the lower portion of the residue fluid riser conduit, should be designed to facilitate "clean" separation of the hydrate from the residue fluid. Accordingly, the hydrate formation and catch sump 434 is designed to impart lateral movement to the residue fluid as well as to permit upward movement thereof. This causes the hydrate/residue fluid mixture to move initially with a relatively small upward component, which facilitates settling out of the hydrate and which is in contrast to the previously described embodiments, which provide more vertically oriented fluid movement that is comparatively turbid and which have poorer settling and separation characteristics.

In the embodiments described thus far, the weight of the column of water creates the pressures required for hydrate formation. In these embodiments, the minimum pressure depth at which hydrate is stable is far greater than at sea level, where the pressure is one atmosphere. Accordingly, the hydrate begins to dissociate at relatively elevated pressures.

Various ones of the embodiments described above may be modified so as to collect the fresh water released from the hydrate and to capture the released gas at the region of the fractionation column where the dissociation takes place, rather than at the top of the column (surface level; one atmosphere ambient pressure), with certain resultant advantages. In particular, relatively large volumes of hydrate-forming gases and gas mixtures are required to desalinate large volumes of water. Therefore, if the gas is captured, processed for re-injection, and stored while maintained at elevated pressures (e.g., the pressure at which the hydrate begins to dissociate), the volume of gas that must be handled will be much smaller than would be the case if the gas were allowed to expand fully as it rises to the surface and pressure drops to atmospheric. Additionally, if the hydrate-forming gas is kept pressurized, raising its pressure to the pressure required for injection in the hydrate-forming section requires far less recompression of the gas and hence is less costly.

Figure 15:
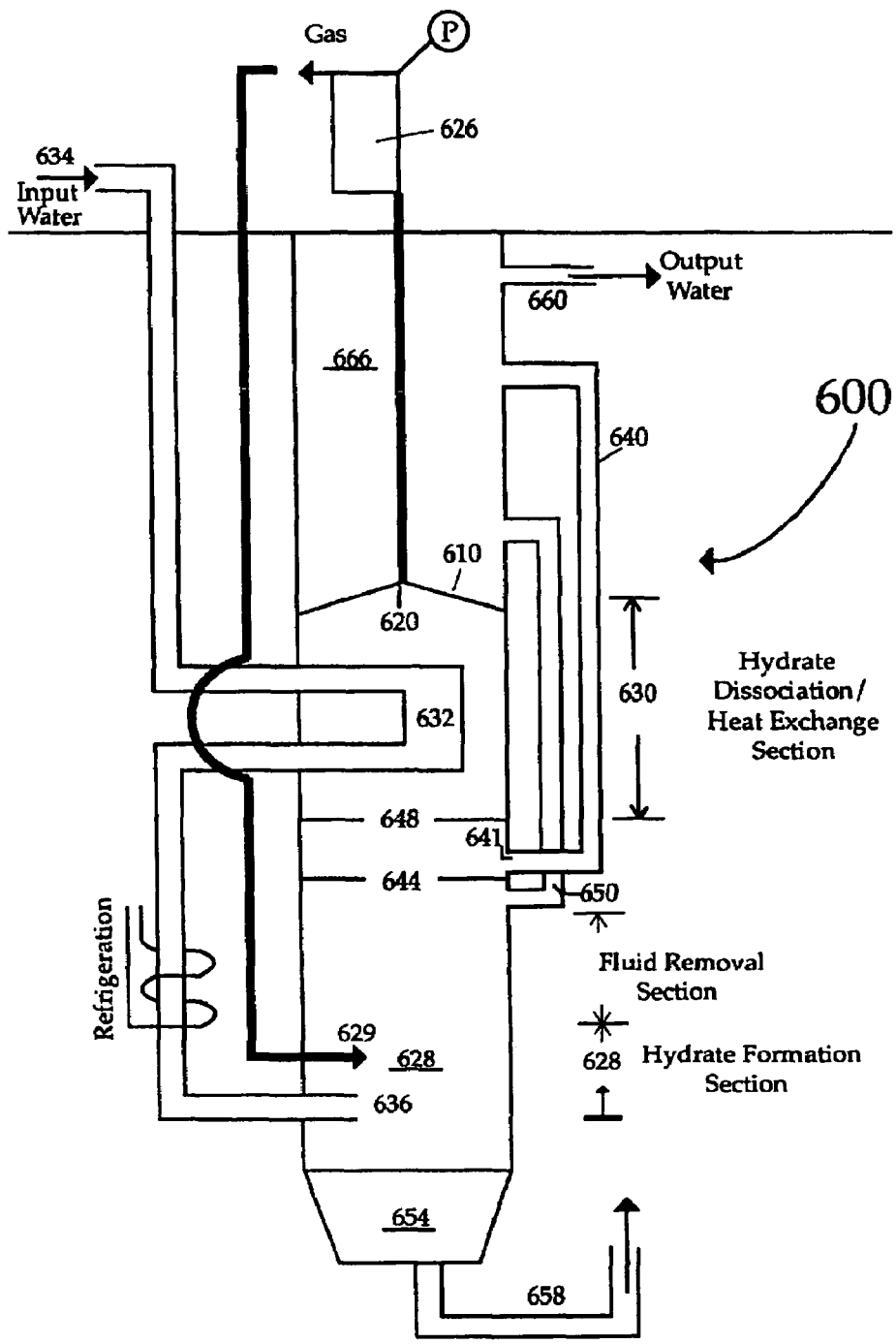
FIG. 15 is a diagrammatic, side elevation view of an embodiment of a hydrate fractionation column configured to maintain the hydrate-forming gas at elevated pressure.

An embodiment 600 in which dissociation and gas capture and processing are controlled so as to be kept at elevated pressure is illustrated in FIG. 15. In this embodiment, a physical barrier 610 extends across the fractionation column and blocks the upward movement of the hydrate slurry. The location of the barrier 610 depends on the stability limits of the particular hydrate-forming substance used, but will be above the region of hydrate stability (i.e., at lesser pressure-depth). As the hydrate dissociates, the released gas forms a pocket at trap 620 and enters a gas recovery and processing system 626 while still at a pressure depth considerably greater than one atmosphere surface pressure. (The gas processing system 626 may contain means for liquefying certain gases.) The gas is processed and re-injected into the hydrate formation section 628 at 629 in the same manner as in the previously described embodiments, except the gas system is maintained at considerably higher pressure.

The hydrate dissociation section 630 extends downward to some particular depth determined by the particular hydrate-forming gas being used. Because the hydrate dissociates under "controlled," elevated pressure, the dissociation reaction will proceed generally more slowly than in the above-described embodiments. Therefore, the heat exchanger 632 present in the dissociation/heat exchanger section (as described in connection with previous embodiments) is designed to accommodate the particular, slower reaction rates. Input water 634 is passed through the dissociation/heat exchange section in heat exchanger 632 and is injected into the base of the desalination fractionation column at 636, as in previously described embodiments.

One or more fresh water bypass pipes 640 communicate with the dissociation region at a point 641 located above the fresh water/saline water interface 644 but below the upper boundary 648 of the hydrate stability field. The pipe(s) 640, which are screened or otherwise configured to prevent hydrate from entering them, deliver fresh water released from the hydrate to fresh water accumulation region 666. A gray water return pipe 650 allows denser, more saline gray water to flow back down into the saline fluid below the fresh water/saline water interface 644. More highly saline residual water and/or negatively buoyant hydrate is drawn from the sump 654 and processed or removed as at 658, as in previously described embodiments. Output fresh water, some of which may be returned to the fluid removal section for purposes of washing interstitial saline water as described above (not shown), is drawn off at 660, near the top of the fresh water accumulation region 666 and well above the physical barrier 610.

It is contemplated that the physical barrier 610, the fresh water and gray water return pipes 640, 650, and the heat exchanger in the dissociation/heat exchange section 630 may be configured such that their positions can be varied, thereby permitting different hydrate-forming liquids, gases, or gas mixtures to be used in the same installation. The physical barrier 610 and heat exchanger might be vertically adjustable, whereas a series of bypass and return pipes 640, 650 having different inlet locations can be provided and opened and closed remotely using suitable inlet and outlet valves. In this manner, changing from one hydrate-forming substance to another can be effected very quickly and conveniently.

By holding and fully processing for re-injection the hydrate-forming gas while it is still under pressure, considerable economies of operation can be achieved. The variation in the pressure of the liquid or gas, from that required for formation of the hydrate down to that at which fresh water is released from the hydrate, can be kept to a minimum. This, in turn, minimizes the energy cost associated with pumping the captured hydrate-forming gas from above the dissociation/heat exchange section back down to the hydrate-forming section at the base of the apparatus, particularly considering the fact that, percentagewise, the greatest change of pressure in a hydraulic column (such as any of the above-described embodiments) takes place in the upper portions of the column. Moreover, the volume of the gas to be handled (and accordingly the size of the gas handling equipment and facility) will also be reduced significantly.

As an alternative (not shown) to the configuration shown in FIG. 15, the upper part of the desalination fractionation column can be sealed and pressurized by means of an associated hydraulic standpipe, thereby causing pressures within the apparatus near the surface to be equivalent to the pressure-height of the standpipe. Where the standpipe is implemented in tall structures (such as adjacent buildings near the desalination facility), relatively high pressures can be created in the topmost part of the dissociation/heat exchange section, which is at ground level.

In further embodiments of the a hydrate-based fluid treatment installation, fluid to be treated may be desalinated or purified in self-contained, mechanically pressurized vessels. Such embodiments offer a number of distinct advantages, including the fact that the installations can be of various sizes and shapes to suit local conditions, containment constraints, and fresh water requirements. Moreover, whereas the previously described embodiments are relatively large-scale and therefore are of a fixed, permanent nature, self-contained, pressurized embodiments can be more temporary in nature in terms of their construction and their location. Individual pressurized installations can occupy relatively small spaces and produce fresh water efficiently, even in low volumes. Such installations can be fabricated at central manufacturing facilities and installed on site with a minimum of local site construction, which site might be a building or even a ship or other mobile platform.

Figure 16:
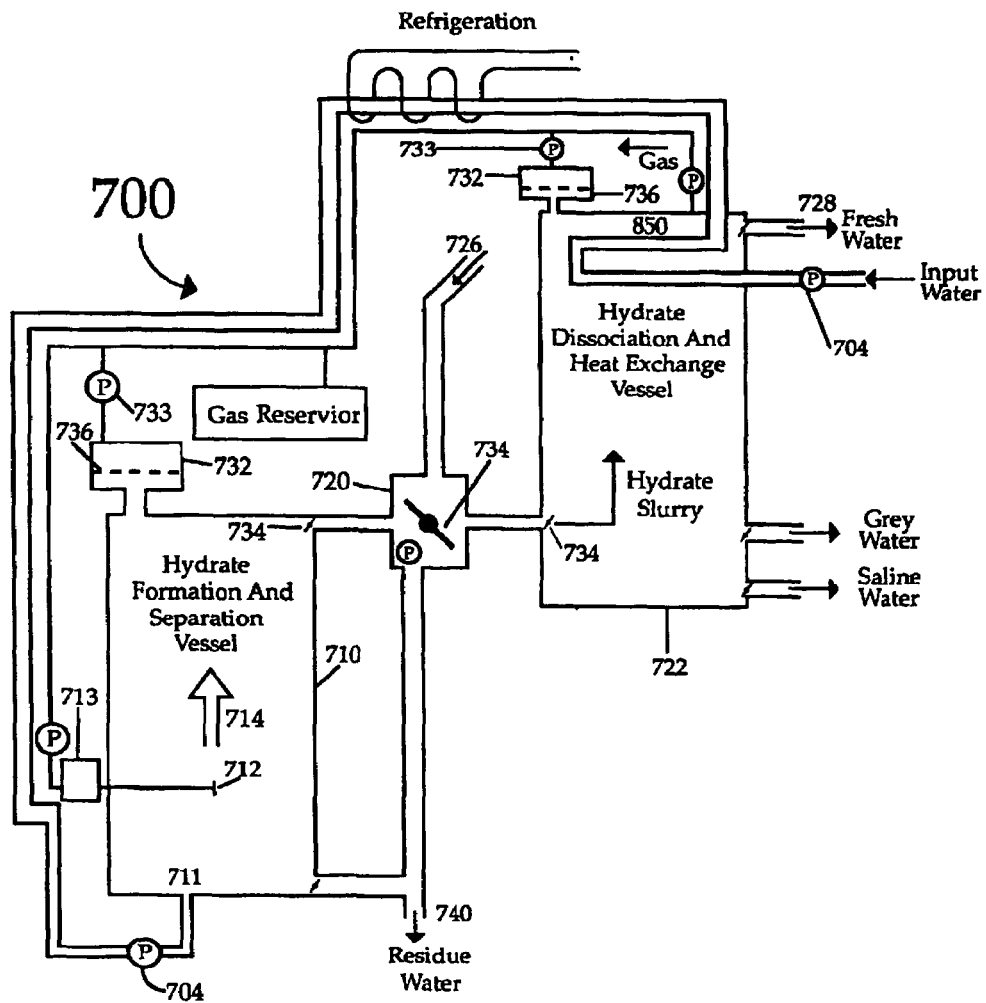
FIG. 16 is a diagrammatic, side elevation view of an embodiment of a mechanically pressurized fluid treatment system configured to use positively buoyant hydrate.

A mechanically pressurized installation configured to use positively buoyant hydrate to extract fresh water from, for example, seawater is illustrated in FIG. 16. Input water is pumped and pressurized from input pressure to the operating system pressure by pump 704. The water enters the pressurized hydrate formation and separation vessel 710 at water input 711, and a suitable, positively buoyant hydrate-forming substance is injected at injection point 712. (Means 713 for liquefying certain gases are provided where this is advantageous to the desalination process.) Positively buoyant hydrate 714 spontaneously forms and rises through the residual water, as in previously described embodiments, to the top of the vessel 710 where it accumulates and concentrates.

The buoyant hydrate slurry is subsequently admitted into transfer and washing section 720, and then into the dissociation/heat exchange vessel 722. (Flow of the hydrate slurry is regulated by valves 734.) While in the transfer and washing section 720, the hydrate may be washed of the residual, intergranular saline fluid using fresh water 726 tapped from the fresh water output 728. More than one wash cycle may be used to completely flush residual fluid, although the number of washings will depend on the effectiveness of separation through fractionation (which may vary for different gases and gas mixtures) and the nature of the crystalline fraction of the slurry. In some cases, no washing may be necessary.

Pressure is maintained in the hydrate formation and separation vessel 710 and in the dissociation/heat exchange vessel 722 by pressure balance reservoir systems 732 (one for each vessel), and movement of fluid from one vessel to the other is controlled by varying pressure and using the in-line valves 734. The systems 732 each have a pressure pump 733 and a diaphragm or gas-fluid interface 736, which are used to raise and lower pressure in each vessel. Pressure in the vessels is controlled so that the hydrate remains stable as hydrate until it is finally collected and concentrated at the top of the dissociation vessel 722. This is because premature dissociation will release considerable amounts of gas and therefore will cause undesired mixing. Moreover, pressure conditions in the dissociation vessel should be controlled to minimize turbulence in the fluid-gas mixture and to promote efficient separation of saline and fresh water.

The dissociation and heat exchange vessel 722 may be constituted by a number of linked, heat-exchanging devices in a number of different water treatment chambers. The actual size, throughput, etc. will depend on the overall system production rate which, in turn, will depend on the temperature of the input water, the particular liquid, gas, or gas mixture used to form the hydrate, the rate at which heat can be removed from the system, etc. Fractionation, concentration, separation, drying, and re-use of the hydrate-forming gas takes place in the same manner as in the previously described embodiments. Additionally, heat produced by liquefying hydrate-forming gas can be absorbed and removed using heat exchangers containing residue or saline fluids.

It will be appreciated that the mechanically pressurized process is inherently less continuous than the previously described embodiments and is essentially a batch process. Pressure in the system is controlled so as to simulate the pressure variation in the previously described embodiments: the fluid to be treated is pressurized and injected into the apparatus, and then pressure is raised and lowered to control the rate of the hydrate formation and dissociation reactions.

Mechanically pressurized embodiments provide increased versatility in that pressures may be controlled to provide the optimum pressures for formation of hydrate and to control the rate of dissociation. Moreover, different liquids, gases, and gas mixtures can be used within the same apparatus, and the same water can be processed more than once using different liquids, gases, and gas mixtures.

Figure 17:
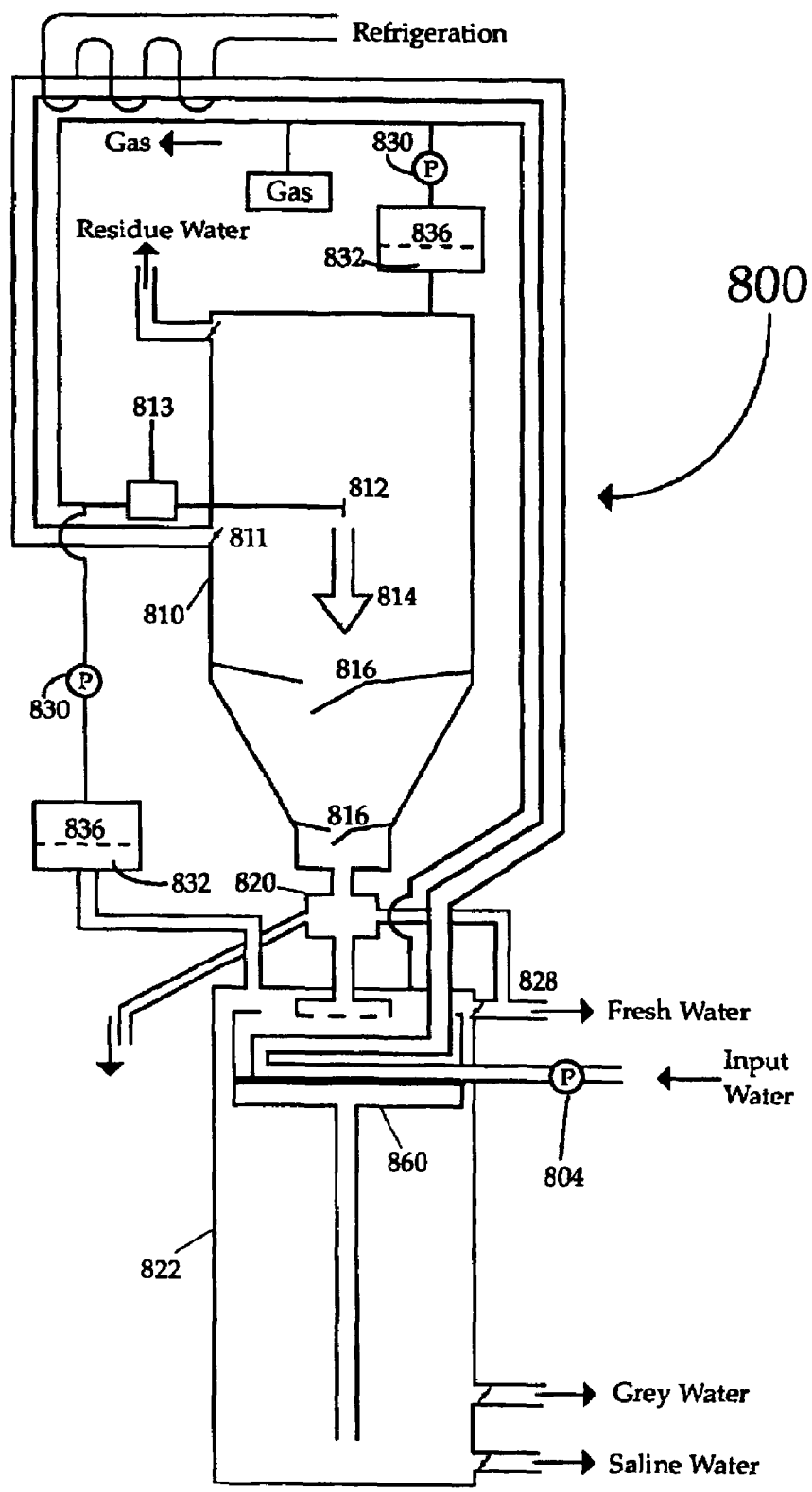
FIG. 17 is a diagrammatic, side elevation view of an embodiment of a mechanically pressurized fluid treatment system which is similar to that shown in FIG. 16 but which is configured to use negatively buoyant hydrate.

A further mechanically pressurized embodiment 800, which embodiment utilizes negatively buoyant hydrate to extract fresh water from the fluid to be treated, is shown in FIG. 17. Input water is pumped from input pressure up to the operating system pressure and into the pressurized hydrate formation and separation vessel 810 by pumps 804, and a suitable, negatively buoyant hydrate-forming gas is injected at injection point 812. (Means 812 for liquefying certain gases may be provided.) Negatively buoyant hydrate 814 spontaneously forms and sinks through the residual water, as described in connection with previously described negatively buoyant hydrate embodiments, and collects and concentrates in gated sump isolation sections 816, which are opened and closed to control passage of the hydrate therethrough.

As in the previously described mechanically pressurized embodiment, pressure is maintained in the system by pressure balance reservoir systems 832 (one for each vessel), and movement of the fluid can be controlled by varying the pressure in the system compartments. Pressure pumps 830 and diaphragms or gas-fluid interfaces 836 are used to raise and lower pressure in each vessel independently.

As the hydrate slurry passes through the transfer and washing section 820 and into the dissociation/heat exchange vessel 822, it may be washed of the residual, intergranular saline fluid with fresh water tapped from the fresh water output 828, which removes salt from the hydrate slurry prior to dissociation.

Subsequently, the hydrate is permitted to flow downward from the transfer and washing section 820, and into the hydrate dissociation and heat exchange vessel 822, where is dissociates and fresh, gray, and saline water are removed. Heat exchange between the input water and the dissociating hydrate slurry occurs as described in previous embodiments. Dissociation takes place under controlled pressure conditions to minimize turbulence in the fluid-gas mixture and to promote efficient separation of saline and fresh water.

A slurry holder and fluid separator tank 860 may be provided in the upper part of the dissociation/heat exchange vessel 822 and is similar in construction to that described above and shown in FIGS. 12 and 13. The tank 860 minimizes mixing of fresh and saline water by providing a conduit for the residual saline water to sink to the bottom of the vessel, which conduit isolates the saline water from the lower density fresh water.

As in the case of the mechanically pressurized, positively buoyant hydrate embodiment, the dissociation and heat exchange vessel 822 may be constituted by a number of linked, heat-exchanging devices in a number of different water treatment chambers. The actual size, throughput, etc. will depend on the production rate which, in turn, will depend on the temperature of the input water, the particular liquid, gas, or gas mixture used to form the hydrate, the rate at which heat can be removed from the system, etc. Fractionation, concentration, separation, drying, and re-use of the hydrate-forming substance takes place in the same manner as in the previously described embodiments.

Figure 18:
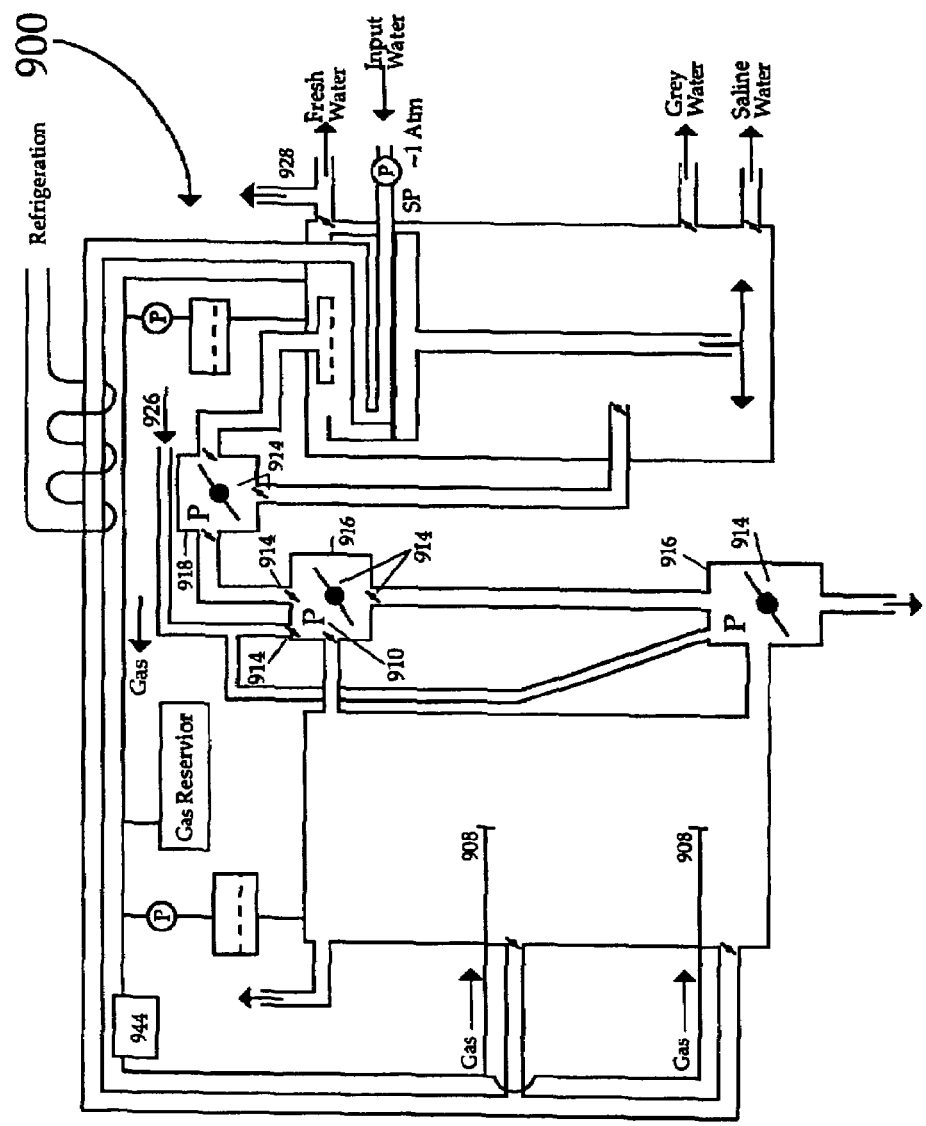
FIG. 18 is a diagrammatic, side elevation view of an embodiment of a mechanically pressurized fluid treatment system configured to use either positively or negatively buoyant hydrate.

Another embodiment 900, which embodiment provides greater versatility by using either positively or negatively buoyant hydrate to treat fluid such as seawater or polluted water, is shown in FIG. 18. Pumps P and in-line valves 914 are provided throughout the system. Operation, depending on the particular hydrate-forming substance used, is as described in the pressurized vessel installations using either positively or negatively buoyant gas hydrate.

This embodiment is particularly useful where the gas or gas mixture supply is uncertain as a variety of gases may be used. Embodiments of this type could be useful in disaster relief or in expeditionary military activity, or at any place where a temporary supply of fresh water is required without a significant construction requirement. This embodiment contains all the attributes of both the positive and negative buoyancy hydrate, mechanically pressurized desalination fractionation embodiments, including use of fresh water 926 from the fresh water output 928 to flush residual saline water. Multiple liquid or gas injection points 908 are provided, as well as provision for handling either positively or negatively buoyant hydrate. In particular, multiple pumping units P and fluid control valves 914 are provided to direct the flow of fluids and hydrate slurries in fluid control and washing units 916 and hydrate slurry control units 918. The gas processing system 944 includes means for liquefying certain recovered gases and gas mixtures.

As in the above-described embodiments in which the weight of the column of water generates the requisite pressures, any of the mechanically pressurized vessel installations may be simplified by feeding the input water into the system without passing it through the dissociation section for heat exchange. More artificial refrigeration will need to be provided, but operation will otherwise be the same as for the positive and negative buoyancy hydrate embodiments shown in FIGS. 16 and 17 and the "combined" pressurized apparatus as shown in FIG. 18.

Similar compact installations can be fabricated as pre-packaged components that can be airlifted or easily flown and trucked to a particular site—for instance, to a waste pond needing decontamination or reduction in water volume—and assembled rapidly. Where temporary or mobile installations are operated, more compact versions of the intake, outfall, and gas processing apparatus similar to that described for FIG. 1 are employed. These can be specially designed for light weight, ease of deployability, and ability to operate in a variety of conditions.

Hydrate-Based Treatment/Reclamation from a Highly Contaminated Body of Water

As explained above, there is a pressing need for better, more versatile, cost-effective techniques to decontaminate and reduce the water volumes of industrial pond waste water inventories and other highly saline or otherwise contaminated bodies of water. Hydrate-based processing is a solution.

Any of the above-described methods for forming, collecting, and dissociating (melting) the hydrate may be employed to do so. Where the body of fluid (e.g., a waste water holding pond) is deep enough to generate the necessary hydrate-forming pressures, an in-land shaft approach as described above and in the referenced patents may be used, with the pond itself constituting the shaft. In that regard, a shaft, as that term is used above or in the referenced patents, can have a width that is generally on the same order of magnitude as its depth. In other words, the term "shaft" does not imply any specific relationship between the width of the body of water and its depth, so long as the shaft extends to some depth into the ground in which the pond is located. However, depending on the fluid being treated, the hydrate-forming substance being employed, and the required hydrate-forming pressures, it may be desirable or advantageous to construct a separate shaft, e.g. adjacent to a waste water holding pond, extending considerably further into the ground than the depth of the waste water holding pond and to conduct hydrate formation and separation in that separate shaft.

Alternatively, any pressurized vessel apparatus, e.g., as described above, may be used to form, collect, and dissociate the hydrate.

Still further, a hybrid, pressurized shaft installation may be used, as described in co-pending U.S. patent application Ser. No. 10/019,691 filed Jan. 2, 2002 (published Oct. 24, 2003 as Publication No. 2002/0155047 and claiming priority to PCT application number PCT/US01/19920 filed Jun. 25, 2001), the contents of which are incorporated by reference.

In conducting hydrate-based treatment of waste ponds or other highly saline/contaminated bodies of water, in order to enhance hydrate formation and growth, it may be desirable to pre-treat the fluid being treated with hydrate-forming substance to some level at or below saturation. Techniques for doing so are described in U.S. Pat. No. 6,673,249 and co-pending U.S. application Ser. No. 10/402,940 filed Apr. 1, 2003, the contents of both of which are incorporated by reference.

Figure 19:
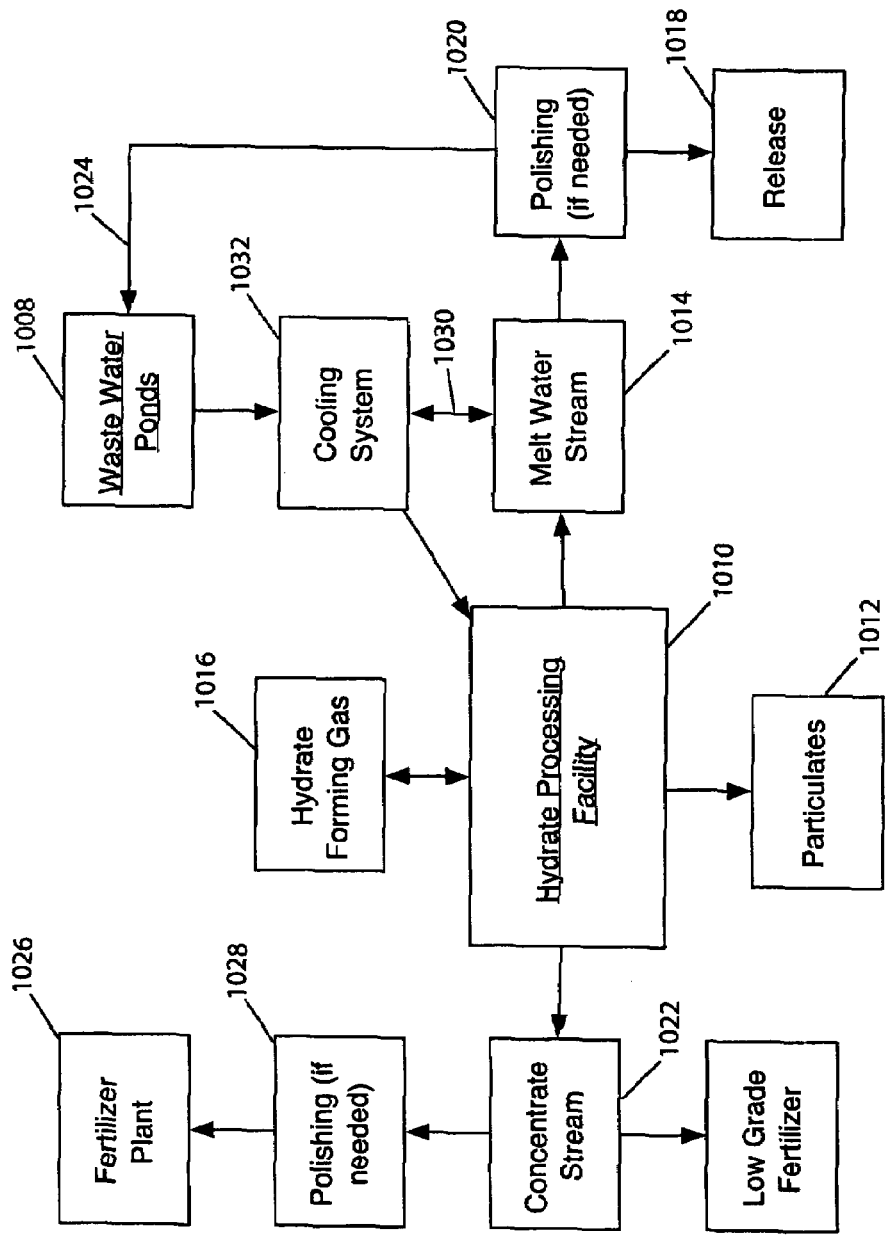
FIG. 19 is a process flow diagram illustrating hydrate-based treatment of and material reclamation from a highly contaminated body of water.

An embodiment of the invention, as applied in the exemplary context of reducing waste water volumes produced by a phosphate fertilizer factory and held in a waste pond 1008, is illustrated in FIG. 19. The Hydrate Processing Facility 1010 can be any suitable facility, as described above, or it can be a waste water pond itself.

In general, crystallizing gas hydrate in a strongly saturated, toxic waste pond-water solution of the sort found in ponds 1008 associated with such a phosphate fertilizer factory causes the nucleation and growth of solid crystalline material (e.g., phosphogypsum, $Ca(P)SO_4$, in which small amounts of phosphate ($PO_4^{3-}$) substitute for sulfate ($SO_4^{2-}$) in the gypsum crystals) as the concentrations of the various solutes rise above saturation. Hydrate formation also strongly rejects suspended particulate matter 1012, which will settle to the bottom of the pond (if the hydrate formation/de-watering process is being conducted in a holding pond) or hydrate-forming installation (shaft or pressure vessel). The material is then dredged (if in a pond) or otherwise removed from the installation, and may simply be piled in large mounds adjacent to the body of water/waste fluid being treated. Alternatively, depending on relative densities of the fluid and the crystallized and/or rejected particulate matter, or if the crystallized and/or rejected particulate matter has fine bubbles of hydrate-forming gas adhered to it, the solid material may "hang" suspended in the fluid column or may rise to the surface on its own. In those instances, the solid material can be removed by filtering or other appropriate means that would be known to one of skill in the art (e.g., centrifugal separation).

Following separation and removal of the hydrate crystals from the residual brines and suspended particulate matter, the hydrate is disassociated (melted), either on a continuous or a batch basis depending on the nature of the installation and process. This produces a melt water stream 1014, and the gas (or other hydrate-forming substance) 1016 and purified water 1014 are separated and recovered. The gas can be reused for further cycles of hydrate formation if desired, thereby reducing the amount of gas required, or it can be disposed of through combustion or other chemical reactions. The melt water 1014 produced from the dissociating hydrate will, in some instances, be pure enough to dispose of as released surface water, e.g., as at 1018. Where slight chemical contamination remains, however, polishing or other conventional purification technology (e.g., reverse osmosis) can be used to economically polish or further process the water to very high levels of purity, as at 1020.

Alternatively or additionally, it may be desirable in some instances to return all or a portion of the melt stream water to the waste water holding pond, as illustrated at 1024. It is noted that the invention has as one of its main benefits the reduction of total volume of the waste water holding ponds for reasons explained above, along with the additional benefit of providing an industrial feedstock stream via the concentrated residual fluid as explained below. However, there may be times (e.g., during droughts) when, if the melt water stream were not returned to the pond, the fluid level of the waste water holding pond would decrease too far or too fast, in which case steady production the enriched feedstock stream of residual fluid (e.g., the phosphate-enriched stream being returned to a phosphate fertilizer plant) would be adversely affected. Additionally, solids would precipitate out at an undesirably high rate and/or the concentration of the residual fluid would be undesirably high.

Because water is being removed from the solution by the hydrate, the concentration of dissolved solute in the solution (e.g., phosphate, mainly in the form of phosphoric acid $H_3PO_4$), dissolved in the pond water) will increase significantly. In general, the concentration of all dissolved ionic materials increases in proportion to the amount of hydrate formed in any particular volume of the water. Thus, the concentration of any particular dissolved chemical species (for example, phosphoric acid) remaining in the concentrated, residual brine stream 1022 (which will also exist either on a continuous or a batch basis, depending on the nature of the installation and process used) can be controlled or regulated by controlling the amount of hydrate produced and removed in the hydrate processing facility 1010, thus achieving a desired level of one or more dissolved species (the level being a desired concentration, total mass, or mass-flow rate). Because the concentrate stream 1022 will have elevated levels of dissolved chemical species, which chemical species will have been used in the underlying or primary chemical process (e.g., producing phosphate fertilizer) and may be used again in the primary chemical process, the residual concentrate or brine stream 1022 preferably is recycled back for further use in the primary industrial or manufacturing chemical process, e.g., back to fertilizer plant 1026. It may be necessary or desirable to polish or otherwise process (chemically or mechanically) the concentrate stream 1022, e.g., as at 1028.

In general, the temperature of the pond water will normally be too high to support spontaneous formation of hydrate at low to moderate pressures. Therefore, the pond water may need to be cooled. Spray evaporation and other refrigeration techniques can be employed as necessary to reach the desired temperatures.

Because crystallization of hydrate is exothermic, further heat must be removed from the hydrate processing facility 1010. The hydrate itself can provide a heat sink during its dissociation, as dissociation is an endothermic process that consumes about the same amount of heat as is liberated during hydrate formation. Various methods to remove heat from the system and to exchange the heat of formation with the heat of dissociation are described above and in the various referenced patents and patent applications. In addition, supplementary cooling of the water-to-be-treated can be provided by heat exchange between the melt water stream and the input water. The various sources of cooling provided are indicated generally or schematically in FIG. 19 by the cooling system 1032, and the double-headed arrow 1030 extending between the melt water stream 1014 and the cooling system 1032 represents the contribution to overall cooling provided by the melt water stream.

In contrast to extracting fresh water from seawater or brackish water, extracting water from highly contaminated water such as waste water ponds may be more constrained due to the large concentration of chemicals already present in the water and because a number of corrosive and poisonous chemical species may be present at near-saturation levels. In addition to the salinities of each of the particular chemical species common to most waste water ponds (which can be quite high, e.g., on the order of 44,000 to 46,000 ppm), the various chemicals and their mixtures dissolved in the water may vary considerably from waste pond to waste pond, because different industrial processes each produce contaminated water having different waste product compositions. Therefore, the particular hydrate-forming gas or mixture of gases used will depend on the particular chemical composition of the particular waste pond or the particular industrial process in connection with which the waste pond is used For instance, in the case of phosphate-rich waste water ponds used to support operation of a phosphate fertilizer factory, which ponds have considerable $H_2S$ and $SO_2$, mixing chlorine with the solution as the hydrate-forming substance produces sulfuric acid ($H_2SO_4$), hydrochloric acid (HCl), and sulfur, depending on relative concentrations and as described by equations 1-3.

$$SO_2(aq)+Cl_2(aq) \rightarrow SO_2Cl_2(aq) \qquad \text{eq. 1}$$

$$SO_2Cl_2(aq)+2H_2O(l) \rightarrow 3H^+(aq)+2Cl^-(aq)+HSO_4^-(aq) \qquad \text{eq. 2}$$

$$H_2S(aq)+Cl_2(aq) \rightarrow S(s)+2H^+(aq)+2Cl^-(aq) \qquad \text{eq. 3}$$

Therefore, while chlorine might be used to reduce phosphate-rich pond water inventory, certain secondary chemical reactions can be anticipated with crystallization of hydrate, which secondary chemical reactions and their byproducts can be accommodated as appropriate using techniques that would be known to and/or understood by one having skill in the art. Such consideration to mixing limitations should be taken into account for almost any toxic industrial waste pond water in which hydrate-forming gas is to be added to remove water through hydrate formation.

Furthermore, some industrial gases typically available at chemical plants can be used as hydrate-forming gases. These gases typically would not be used for gas hydrate desalination where the object of the process is to provide potable drinking water. However, because these gases are readily available and are already the subject of safe handling practices at chemical plant facilities, it may be desirable to use such gases in the context of treating chemically toxic, polluted water. For example, some hydrate-forming gases commonly available at phosphorous fertilizer production installations (where large amounts of sulfuric acid may also be made and used) include hydrogen sulfide ($H_2S$), sulfur dioxide ($SO_2$), sulfur trioxide ($SO_3$), and sulfur hexafluoride ($SF_6$). In addition, large amounts of chlorine are commonly present at major industrial sites. Although many of these gases can be toxic and dangerous, major industrial plants generally handle large quantities of these and other such materials and have safe handling procedures in place for their use. Therefore, these materials may suitably be chosen for use as hydrate-forming substances.

Figure 20:
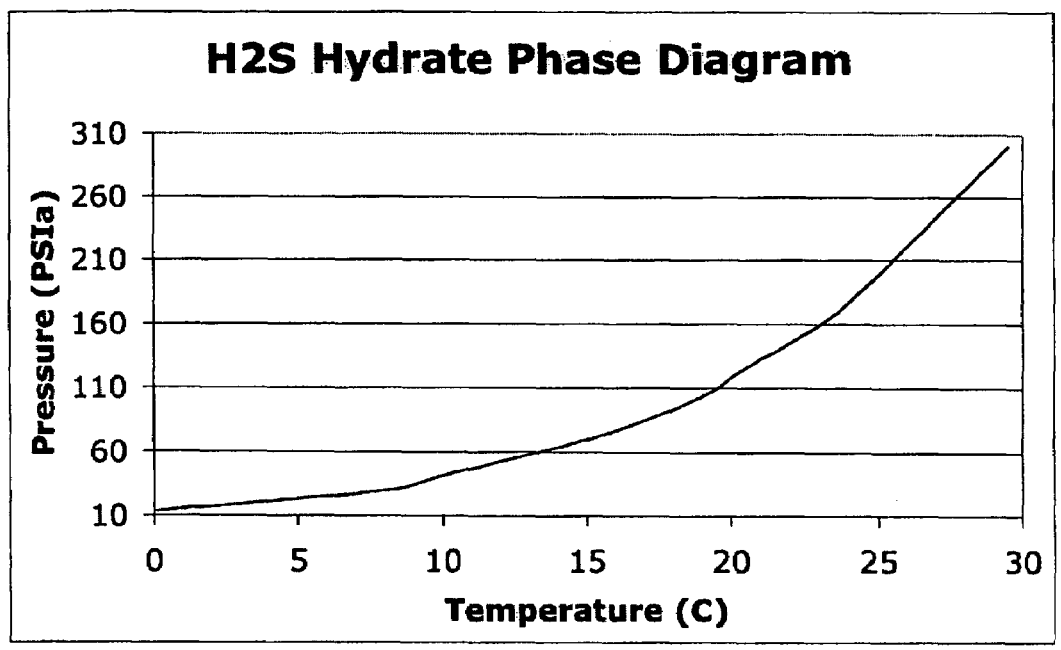
FIG. 20 is a simplified hydrogen sulfide hydrate stability diagram.
Figure 21:
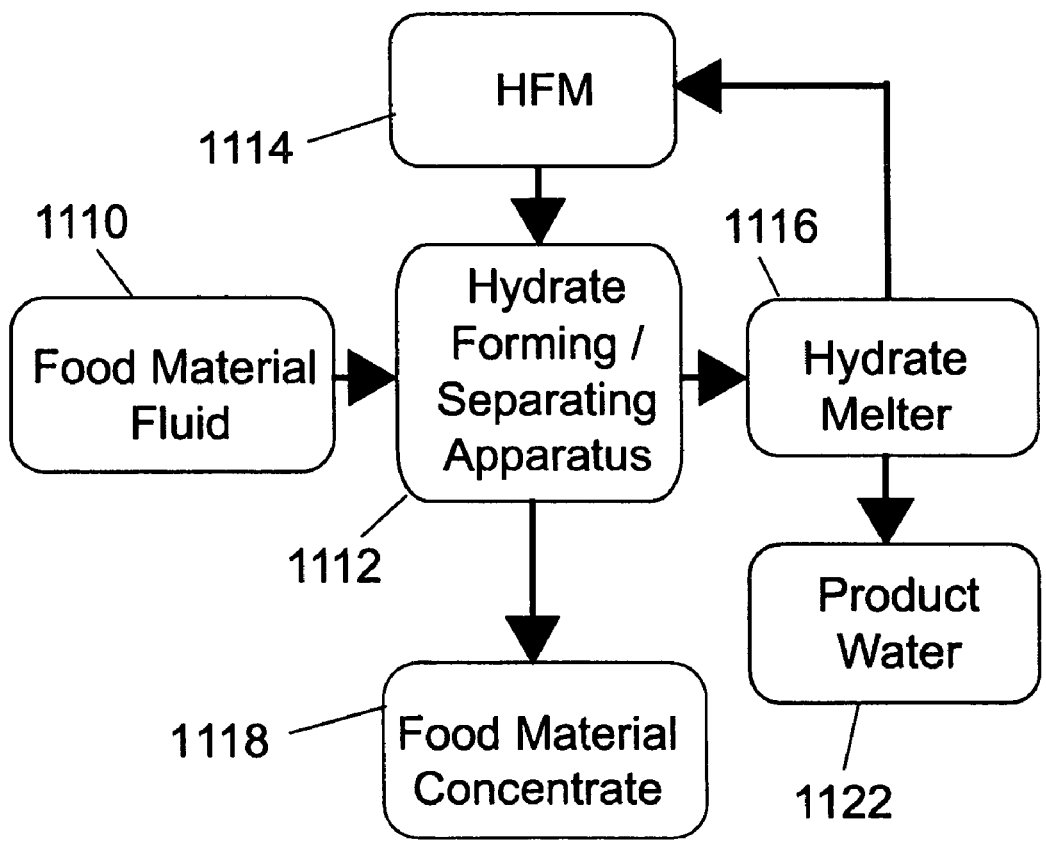
FIG. 21 is a process flow diagram illustrating hydrate-based treatment of and material concentration of food product.

In this regard, it should be noted that one distinct advantage of using such generally hazardous industrial gases for the purpose of hydrate formation is that this group of gases generally will form gas hydrate at relatively low pressures and relatively high temperatures, which helps reduce process cost. For example, $H_2S$ gas hydrate, the phase diagram for which is shown in FIG. 20, forms below a temperature of 29.5 degrees C. at 325 PSIa, and those conditions are relatively easy to achieve.

Additional cooling will directly affect the concentration of the concentrated phosphoric acid recycle stream, which is returned to the industrial chemical plant for further use as an industrial feedstock. By way of specific, non-limiting example at one particular temperature point, production of and removal of $H_2S$ gas hydrate from typical phosphate pond water at 18° C. will produce a phosphoric acid concentrate stream that is nine times as concentrated as the normal input concentrations of phosphoric acid to the fertilizer factory. Finally, when the concentration of dissolved chemicals is increased to the point of saturation as hydrate is formed and water is extracted from the fluid in the process, crystal growth of various mineral species will occur. For example, where average waste pond water from phosphate fertilizer manufacture is processed according to the above invention, gypsum and phosphogypsum are formed. These solids, which may be individually very fine-grained, are typically considered waste products that are produced during any water concentration process but which advantageously are recovered and used in various processes as described above (e.g., in road beds and wallboard).

Furthermore, various other applications of hydrate-based dewatering technique, in a process similar to that described above for treating phosphate pond water, exist and involve removing water from other toxic materials during industrial processing. For instance, in the production of acids (e.g., sulfuric acid), thermal evaporative processes are commonly used to remove water. Also, controlled exposure of sulfur trioxide to water as a component of the acid manufacturing process also produces heat that can drive evaporation. Notably, these evaporative processes often involve high temperatures that increase the risk of combustion or explosion. Using hydrate to remove water content as described above, on the other hand, involves carrying out the removal under considerably lower pressures and moderate temperatures that lower the overall risk of combustion or explosion. Accordingly, hydrate-based dewatering is a highly advantageous alternative to conventional dewatering processes in a diverse range of industrial chemical processing operations.

Furthermore, the power of using hydrate to remove water, with the attendant concentration of the residual matter, can be put to advantageous use in other areas as well—particularly concentrating food products, as illustrated in Figure. In particular, a food material fluid 1110 such as milk or juice to be concentrated, in liquid or fluid form, is introduced into hydrate-forming apparatus, e.g., a pressure vessel, illustrated schematically at 1112. The apparatus 1112 includes hydrate separation apparatus such as described and illustrated above (e.g., centrifugal separation apparatus). The temperature and pressure conditions in the hydrate-forming apparatus 1112 are controlled such that gas hydrate will spontaneously form and grow when hydrate-forming material 1114 (gas or liquid) is administered in a controlled fashion to achieve nucleation and growth of the gas hydrate. These conditions will usually be more gentle to the food material, or easier and less expensive to obtain, than the evaporation techniques that are currently employed. In addition, these conditions are generally less likely to cause spoilage of food products than are the higher-temperature evaporative processes described above.

Gas hydrate forms within the food material fluid 1110 in the hydrate processing and separation apparatus 1112, thereby sequestering water into an easily removed solid phase and raising the concentration of the food material fluid in the apparatus 1112. The solid hydrate is removed from the process fluid and passed to hydrate melter 1116, and residual, concentrated food material product 1118 is removed for further processing and/or packaging. The concentrate 1118, which is the more viscous residual fluid remaining after the hydrate is removed, is removed to storage or other apparatus and may be used as feedstock for another process (e.g., concentrated whey) or as the final product itself (orange juice concentrate, evaporated milk, etc.).

Once the hydrate is separated, it is decomposed in hydrate melter 1116, thus producing relatively pure water with few contaminants. Because these contaminants are all derived from the food product, this water may be suitable for other food processing-related uses with little or no treatment. The produced water is removed for possible further treatment and may be used as potable water 1122. The hydrate-forming material 1114, which is usually gas but may be liquid (e.g., liquid carbon dioxide), may be captured and reused in further cycles of hydrate formation; it may added to the food product to achieve some purpose such as carbonation or preservation; or it may simply be discarded.

Although particular and specific embodiments of the invention have been disclosed in some detail, numerous modifications will occur to those having skill in the art, which modifications hold true to the spirit of this invention. Such modifications are deemed to be within the scope of the following claims.

What is claimed is:

1. A method for treating a highly polluted or otherwise contaminated solution comprising water and one or more solutes dissolved therein, the solution being a byproduct of an industrial process, said method comprising:

mixing a hydrate-forming substance with the solution under pressure and temperature conditions suitable for hydrate to form, whereby hydrate of said hydrate-forming substance forms and removes water from said solution to produce residual fluid having higher concentration of said one or more solutes than said solution;

removing said hydrate from said residual fluid; and providing said residual fluid to said industrial process as an industrial feedstock of said one or more solutes.

2. The method of claim 1, further comprising dissociating said hydrate to release water and hydrate-forming substance therefrom.

3. The method of claim 2, further comprising returning water released from said hydrate to said contaminated solution.

4. The method of claim 2, further comprising releasing water released from said hydrate to surface waters.

5. The method of claim 2, further comprising reusing hydrate-forming substance released from said hydrate in additional cycles of hydrate formation.

6. A method for treating a highly polluted or otherwise contaminated solution comprising water and one or more solutes dissolved therein, the solution being a byproduct of an industrial process, said method comprising:

mixing a hydrate-forming substance with the solution under pressure and temperature conditions suitable for hydrate to form, whereby hydrate of said hydrate-forming substance forms and removes water from said solution to produce residual fluid having higher concentration of said one or more solutes than said solution; and removing said hydrate from said residual fluid;

wherein sufficient amounts of water is removed from said solution via said hydrate to raise the concentration of said one or more solutes in said residual fluid to saturation levels, whereby at least one of said one or more solutes precipitates out of said residual fluid;

said method further comprising collecting said precipitated solute material.

7. The method of claim 6, further comprising dissociating said hydrate to release water and hydrate-forming substance therefrom.

8. The method of claim 7, further comprising returning water released from said hydrate to said contaminated solution.

9. The method of claim 7, further comprising releasing water released from said hydrate to surface waters.

10. The method of claim 7, further comprising reusing hydrate-forming substance released from said hydrate in additional cycles of hydrate formation.

* * * * *